US010782239B2

(12) United States Patent
Humphrey

(10) Patent No.: US 10,782,239 B2
(45) Date of Patent: Sep. 22, 2020

(54) PHOSPHOROUS-BASED SENSORS FOR DETECTION OF MULTIPLE SOLVENTS

(71) Applicant: Board of Regents, The University of Texas System, Austin, TX (US)

(72) Inventor: Simon M. Humphrey, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 246 days.

(21) Appl. No.: 15/572,411

(22) PCT Filed: May 10, 2016

(86) PCT No.: PCT/US2016/031593
§ 371 (c)(1),
(2) Date: Nov. 7, 2017

(87) PCT Pub. No.: WO2016/183053
PCT Pub. Date: Nov. 17, 2016

(65) Prior Publication Data
US 2018/0149599 A1    May 31, 2018

Related U.S. Application Data

(60) Provisional application No. 62/159,602, filed on May 11, 2015, provisional application No. 62/281,830, filed on Jan. 22, 2016.

(51) Int. Cl.
G01N 21/00     (2006.01)
G01N 21/78     (2006.01)
(Continued)

(52) U.S. Cl.
CPC ............ G01N 21/78 (2013.01); C09K 11/06 (2013.01); G01N 31/22 (2013.01);
(Continued)

(58) Field of Classification Search
CPC ...................................... G01N 21/78
(Continued)

(56) References Cited

U.S. PATENT DOCUMENTS

2007/0087452 A1    4/2007  Parker et al.
2014/0287514 A1    9/2014  Humphrey et al.

FOREIGN PATENT DOCUMENTS

CN    102153575 A    8/2011
EP    0259951 A2    3/1988

OTHER PUBLICATIONS

Ibarra et al. "Molecular sensing and discrimination by a luminescent terbium-phosphine oxide coordination material" Chem. Commun., 2013, 49, 7156 (Year: 2013).*

(Continued)

Primary Examiner — Christopher Adam Hixson
Assistant Examiner — Emily R. Berkeley
(74) Attorney, Agent, or Firm — Farhang Amini; Winstead PC

(57) ABSTRACT

Embodiments of the present disclosure pertain to methods of monitoring an environment for the presence of a solvent by: (i) exposing the environment to a luminescent compound, where the relative luminescence emission intensity of the luminescent compound changes upon interaction with the solvent; and (ii) monitoring a change in the relative luminescence emission intensity of the luminescent compound, where the absence of the change indicates the absence of the solvent from the environment, and where the presence of the change indicates the presence of the solvent in the environment. The luminescent compounds include a phosphorous atom with one or more carboxyl groups, where the carboxyl groups are coordinated with one or more metallic ions (e.g., lanthanide ions and yttrium ions). The present disclosure also pertains to sensors for monitoring an environment for (Continued)

14 Claims, 19 Drawing Sheets

(51) Int. Cl.
 C09K 11/06 (2006.01)
 G01N 31/22 (2006.01)
 G01N 21/77 (2006.01)
(52) U.S. Cl.
 CPC ..... C09K 2211/1014 (2013.01); C09K 2211/182 (2013.01); G01N 2021/7786 (2013.01)
(58) Field of Classification Search
 USPC .......................................................... 436/172
 See application file for complete search history.

(56) References Cited

OTHER PUBLICATIONS

Ilich A. Ibarra et al. "Gas sorption and luminescence properties of a terbium(III)-phosphine oxide coordination material with two-dimensional pore topology" Dalton Trans., 2012, 41, 8003 (Year: 2012).*
Lee et al. "Charge effect of foreign metal ions and the crystal growth process in hybridized metal-organic frameworks" Chem. Commun., 2012, 48, 10847-10849 (Year: 2012).*
Ibarra et al. "Organic Vapor Sorption in a High Surface Area Dysprosium(III)-Phosphine Oxide Coordination Material" Inorg. Chem. 2012, 51, 12242-12247 (Year: 2012).*
Lin et al. "Microwave-Assisted Synthesis of a Series of Lanthanide Metal-Organic Frameworks and Gas Sorption Properties" Inorg. Chem. 2012, 51, 1813-1820 (Year: 2012).*
Lee et al. "Microporous Lanthanide-Organic Frameworks with Open Metal Sites: Unexpected Sorption Propensity and Multifunctional Properties" Inorg. Chem. 2010, 49, 4723-4725 (Year: 2012).*
Waggoner et al. "Magnetism of Linear [Ln3]9+ Oxo-Bridged Clusters (Ln=Pr, Nd) Supported inside a [R3PR']+ Phosphonium Coordination Material" Inorg. Chem. 2014, 53, 12674-12676 (Year: 2014).*
Extended European Search Report for European Patent Application 16 793 357.1 dated Jan. 2, 2019, pp. 1-8.
Atkinson et al., "NMR and Luminescence Binding Studies of Ytterbium, Thulium, and Europium Macrocyclic Complexes with Phosphorus(V) Oxy Anions," Helvetica Chimica Acta, vol. 88, No. 3, 2005, pp. 391-405.
International Preliminary Report on Patentability for International Application No. PCT/US2016/031593 dated Nov. 23, 2017, pp. 1-8.
Zhan et al., "A Luminescent Mixed-Lanthanide-Organic Framework Sensor for Decoding Different Volatile Organic Molecules," Analytical Chemistry, vol. 86, 2014, pp. 6648-6653.
Written Opinion of the International Searching Authority for International Application No. PCT/US2016/031593 dated Oct. 17, 2016, pp. 1-6.
Sam Dunning, "Development of Luminescent Mixed-Metal and Functionalised PCMS," Presentation, University of Washington, Seattle, Washington, May 12, 2015, pp. 1-36.
Waggoner et al., "Metal-Organic Frameworks as Chemical Sensors," Chapter 7 of RSC Smart Materials, Jan. 2015, pp. 192-245.
Humphrey et al., Hysteretic sorption of light gases by a porous metal-organic framework containing tris(para-carboxylated) triphenyphosphine oxide, Chem. Commun. 2008, 2891-2893.
Humphrey et al., Metal-organophosphine and metal-organophosphonium frameworks with layered honeycomb-like structures, Dalton Trans. 2009, 2298-2305.
Lu et al., "A Facile Strategy for the Construction of Purely Organic Optical Sensors Capable of Distinguishing D2O from H2O", Angew. Chem. 2019, 131, 6346-6350.
Hawes et al., "Multichannel Luminescent Lanthanide Polymers as Ratiometric Sensors for D2O", Chem 2017, 2, 459-469.
Ibarra et al., "Molecular sensing and discrimination by a luminescent terbium-phosphine oxide coordination material", Chem. Commun., 2013, 49, 7156.
Ibarra et al.,"Gas sorption and luminescence properties of a terbium(III)-phosphine oxide coordination material,.." , Dalton Trans. 2009, 2298-2305.
Office Action for Chinese Application No. 201680027678.6, Issued by the National intellectual Property Association of the People's Republic of China dated Dec. 10, 2019.
Response to Office Action for Chinese Application No. 201680027678.6, Filed on Apr. 10, 2020.
Kotek et al., Lanthanide(iii) Complexes of Novel Mixed Carboxylic-Phosphorus Acid Derivatives of Diethylenetriamine: A Step towards More Efficient MRI Contrast Agents, Chem. Eur. J. 2003, 9, 5899-5915.

* cited by examiner

US 10,782,239 B2

PHOSPHOROUS-BASED SENSORS FOR DETECTION OF MULTIPLE SOLVENTS

CROSS-REFERENCE TO RELATED APPLICATIONS

This application claims priority to U.S. Provisional Patent Application No. 62/159,602, filed on May 11, 2015; and U.S. Provisional Patent Application No. 62/281,830, filed on Jan. 22, 2016. The entirety of each of the aforementioned applications is incorporated herein by reference.

STATEMENT REGARDING FEDERALLY SPONSORED RESEARCH

This invention was made with government support under Grant no. DMR1506694 awarded by National Science Foundation. The government has certain rights in the invention.

BACKGROUND

Current methods and sensors for detecting solvents in various environments have numerous limitations, including limitations in terms of speed, efficiency, accuracy, and reproducibility. For instance, current methods of detecting solvents within solvent feed stocks require sample isolation and chemical analysis. The present disclosure addresses such limitations.

SUMMARY

In some embodiments, the present disclosure pertains to methods of monitoring an environment for the presence of a solvent. In some embodiments, the methods include: (i) exposing the environment to a luminescent compound, where the relative luminescence emission intensity of the luminescent compound changes upon interaction with the solvent; and (ii) monitoring a change in the relative luminescence emission intensity of the luminescent compound, where the absence of the change indicates the absence of the solvent from the environment, and where the presence of the change indicates the presence of the solvent in the environment.

The luminescent compounds of the present disclosure include a phosphorous atom with one or more carboxyl groups, where the carboxyl groups are coordinated with one or more metallic ions. In some embodiments, the metallic ions include, without limitation, lanthanide ions, yttrium ions, and combinations thereof. In some embodiments, the phosphorous atom in the luminescent compound is oxidized. In some embodiments, the luminescent compound is porous. In some embodiments, the luminescent compound is in the form of a crystalline lattice, where the metallic ions in the luminescent compound coordinate with carboxyl groups on adjacent luminescent compounds to form the crystalline lattice.

In some embodiments, the environment is a liquid environment, such as reservoirs, water formations, solutions, solvent feed stocks, and combinations thereof. In some embodiments, the solvent to be detected in the environment includes, without limitation, water, alcohols, dioxane, toluene, dimethyl formamide, hexanes, chloroform, acetonitrile, pyridine, deuterium oxide, and combinations thereof.

In some embodiments, environments are exposed to a luminescent compound by methods that include, without limitation, mixing, incubating, swapping, dipping, and combinations thereof. In some embodiments, the change in the relative luminescence emission intensity of the luminescent compound occurs when the solvent in the environment reversibly penetrates the luminescent compound. In some embodiments, the change in the relative luminescence emission intensity of the luminescent compound is represented by a change in color, a change in visible light emission intensity, a change in visible light emission pattern, and combinations thereof.

In some embodiments, the change in the relative luminescence emission intensity of the luminescent compound is monitored visually, in real-time, by utilization of a spectrometer, or by combinations of such methods. In some embodiments, a single luminescent compound is utilized to monitor the presence of a plurality of different solvents in the environment, where each of the plurality of different solvents causes a distinguishable change in the relative luminescence emission intensity of the luminescent compound. In some embodiments, a plurality of different luminescent compounds are utilized to monitor the presence of one or more solvents in the environment.

In additional embodiments, the present disclosure pertains to sensors for monitoring an environment for the presence of a solvent. In some embodiments, the sensors include one or more luminescent compounds of the present disclosure.

FIGURES

FIG. 1 provides a scheme of a method of monitoring an environment for the presence of a solvent.

FIG. 2 provides various illustrations of phosphine coordination material 22 (PCM-22), including the nodal connectivity in PCM-22 (FIG. 2A); space-filling view of PCM-22 along the c-axis showing 1D hexagonal channels (FIG. 2B); space-filling view perpendicular to channel direction, showing close-stacking of adjacent sheets (alternate sheets shown in green for clarity) (FIG. 2C); 3,3,-connected net version of FIG. 2C (FIG. 2D), where P=pink and Tb=blue); and the closest inter-layer O—H interactions (dashed green bonds) (FIG. 2E).

Figure 8A:
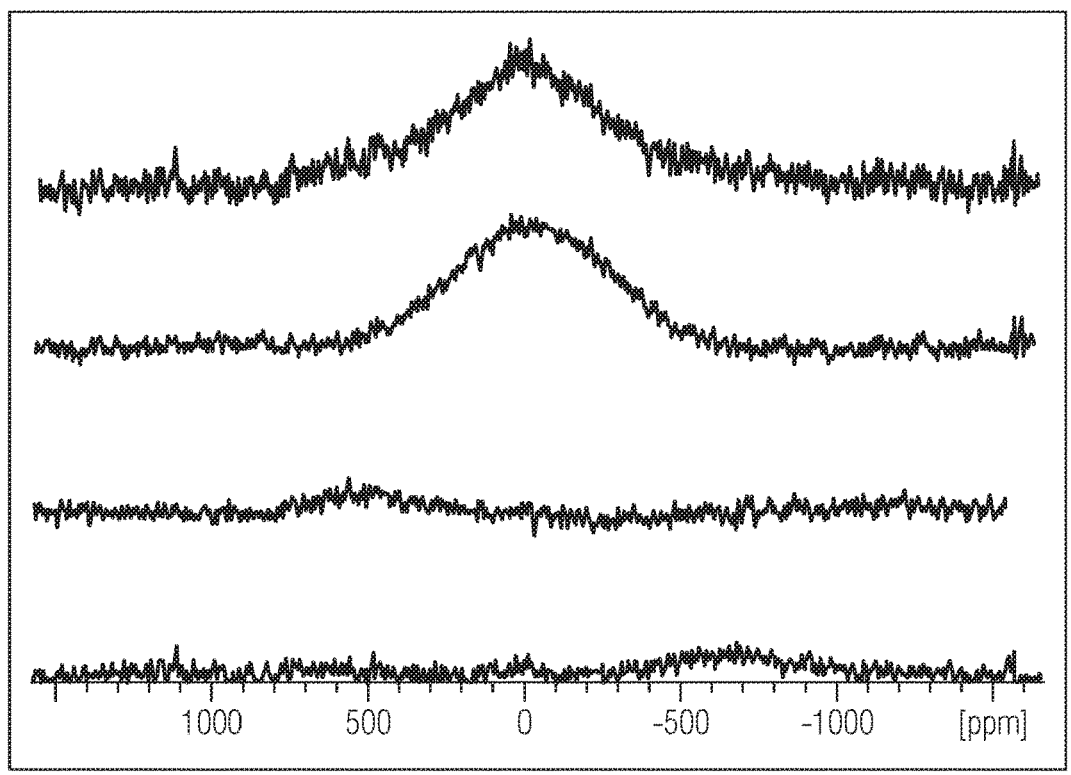
Figure 8B:
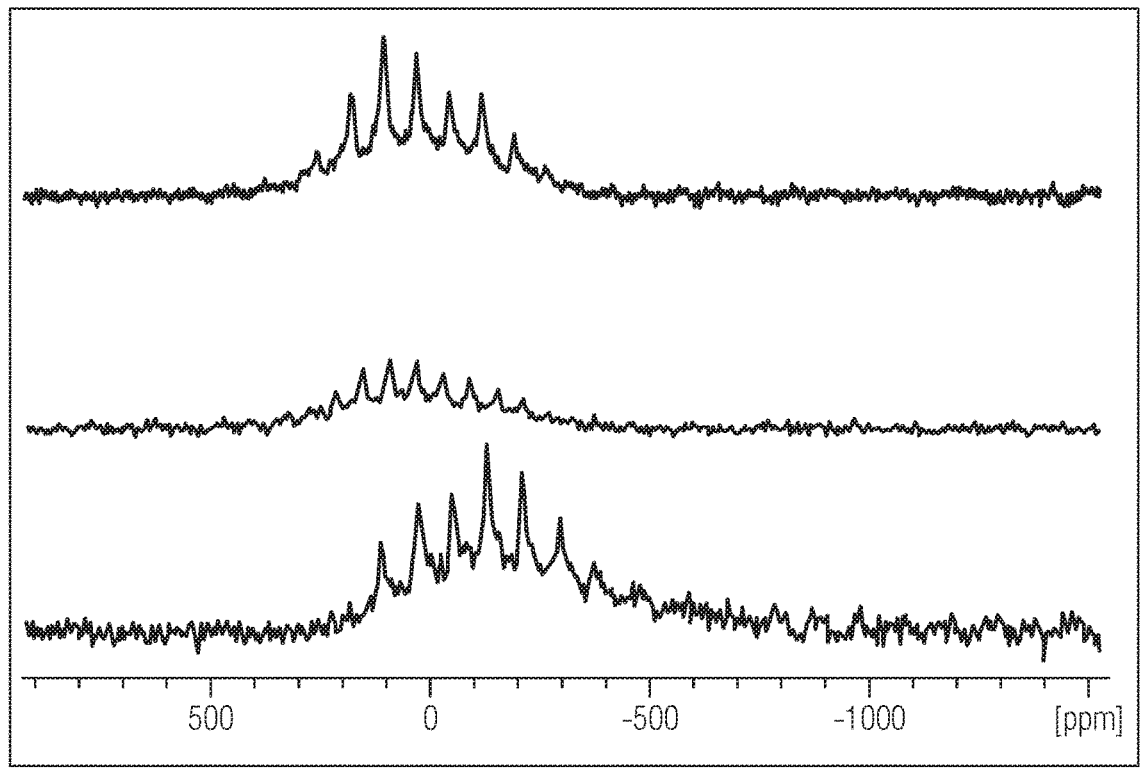

FIG. 8 shows the $^{31}P\{^1H\}$ NMR spectra of various PCM-22 compounds, including the $^{31}P\{^1H\}$ NMR spectra of static Tb-PCM-22 showing spin-mapping experiments at various carrier frequencies (FIG. 8A, 1000 ppm (bottom), 1000 ppm (next) and 0 ppm (next); Top: a sum of the previous three spectra); and the $^{31}P\{^1H\}$ NMR spectra of Tb—O=PCM (FIG. 8B, obtained in a sample spinning at 12 kHz (top), 10 kHz (next) and 13 kHz (bottom)).

Figure 9:
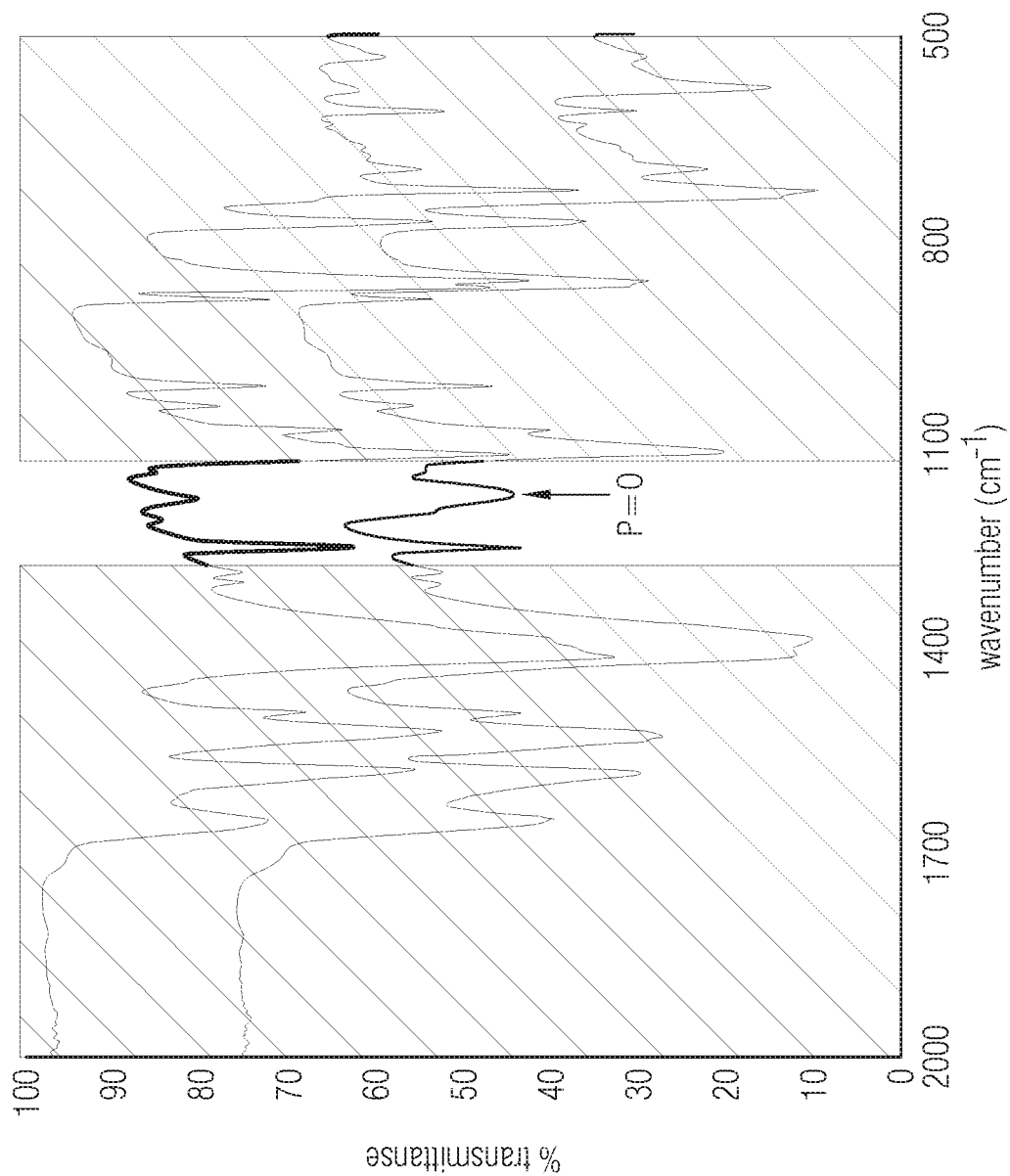

FIG. 9 shows a Fourier transform infrared spectroscopy (FT-IR) of PCM-22 (green, top) and O=PCM-22 (black, bottom).

Figure 10:
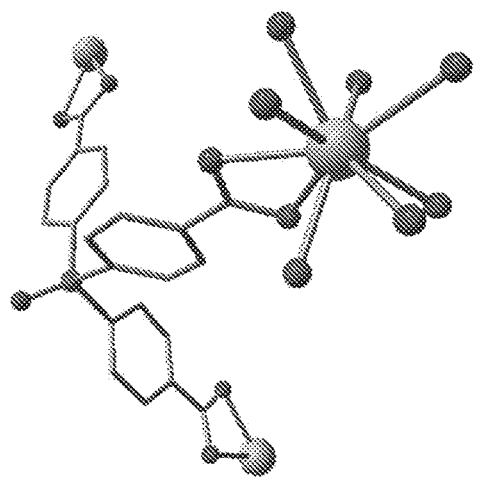
Figure 10:
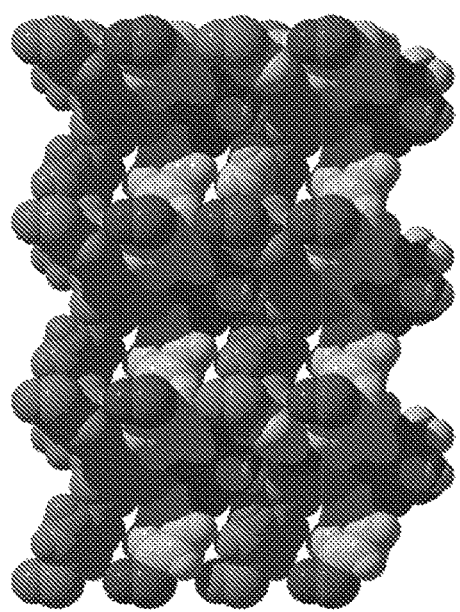
Figure 10:
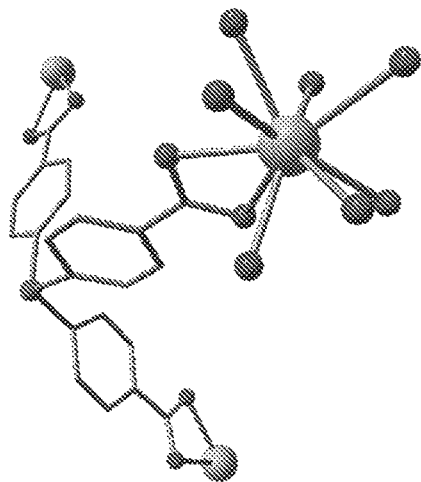
Figure 10:
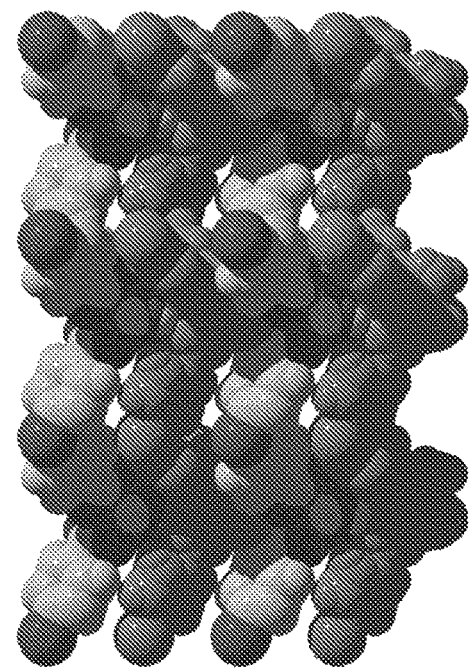

FIG. 10 shows a comparison of single crystal structures before and after oxidation at P. The top image shows a view of one P center. The bottom image shows a comparative view of packing, perpendicular to the plane of the sheets.

Figure 11:
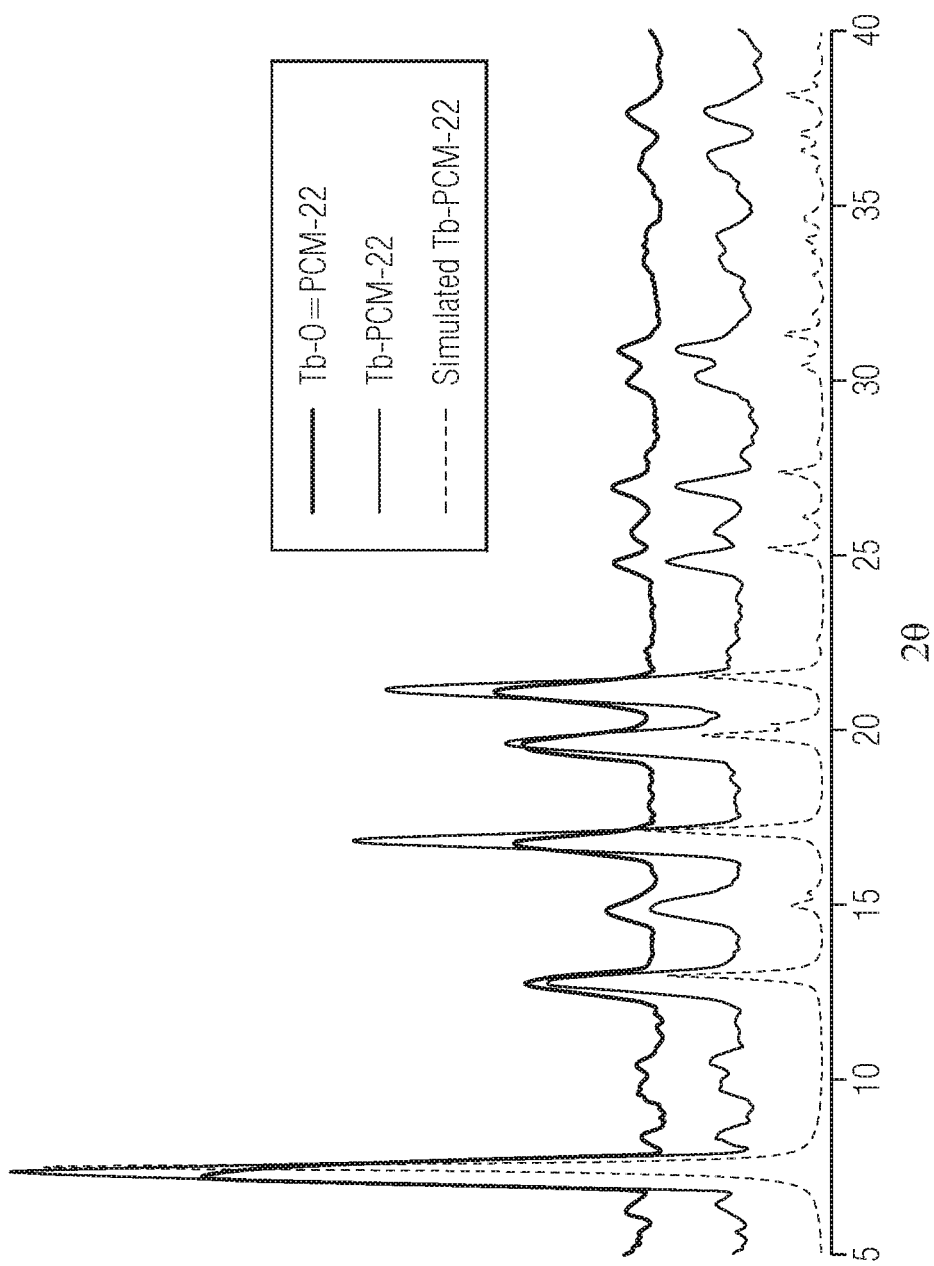

FIG. 11 shows a powder x-ray diffraction (PXRD) of PCM-22 and O=PCM-22 compared to the simulated powder pattern.

Figure 12:
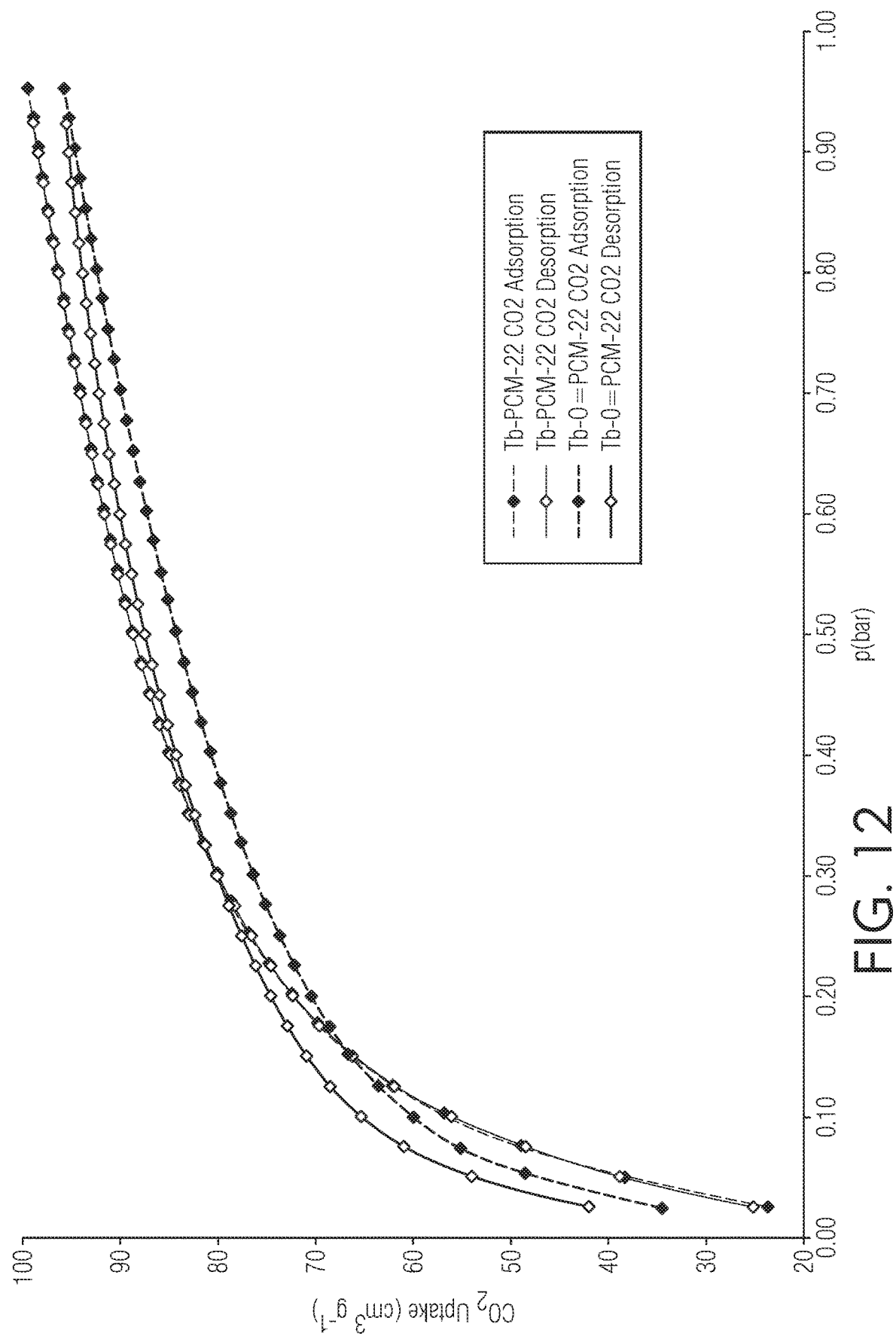

FIG. 12 shows a comparison of $CO_2$ adsorption-desorption isotherms for PCM-22 and O=PCM-22.

Figure 13:
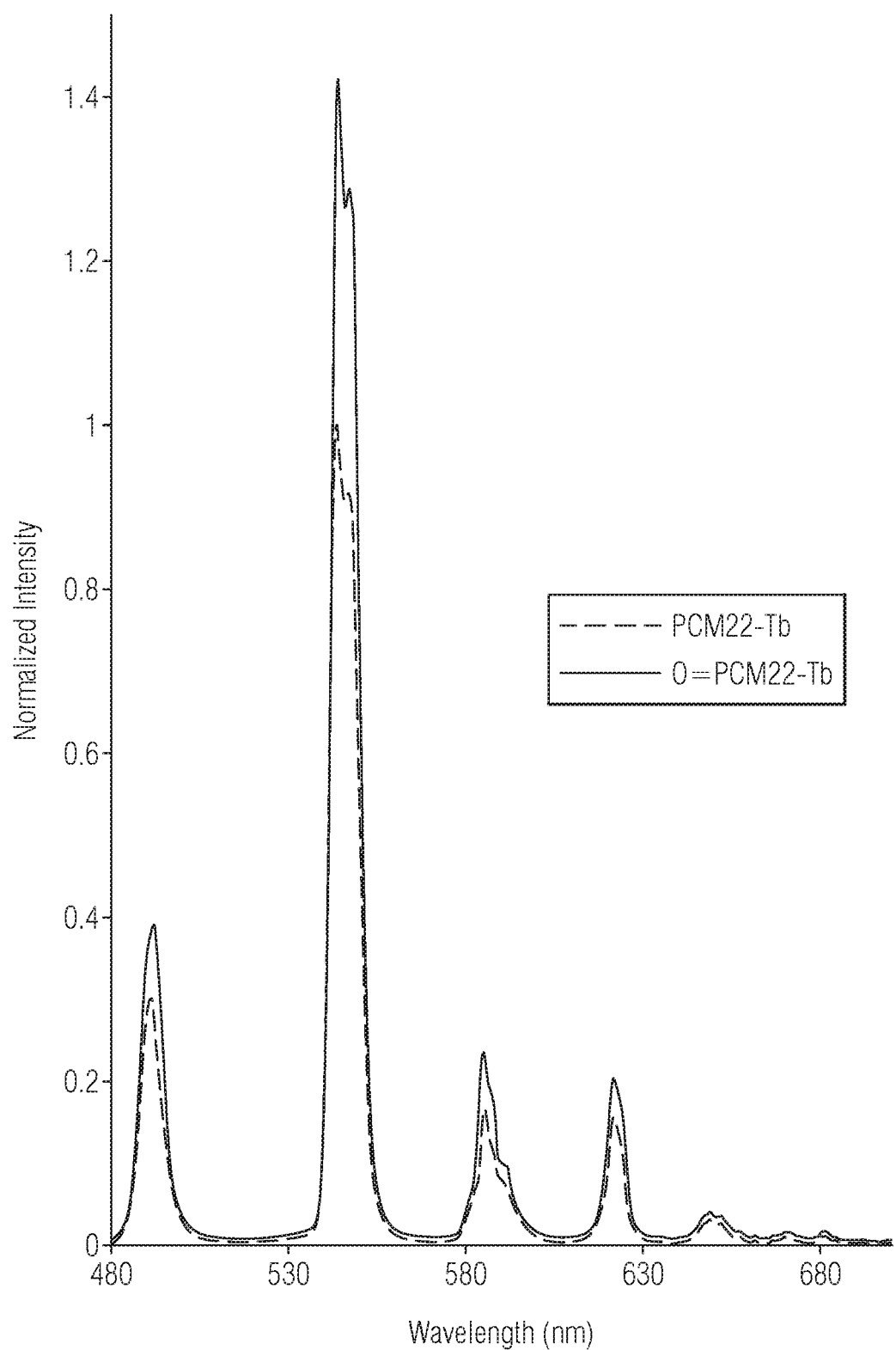

FIG. 13 shows a comparison of normalized emission spectra for PCM-22 and O=PCM-22.

Figure 14B:
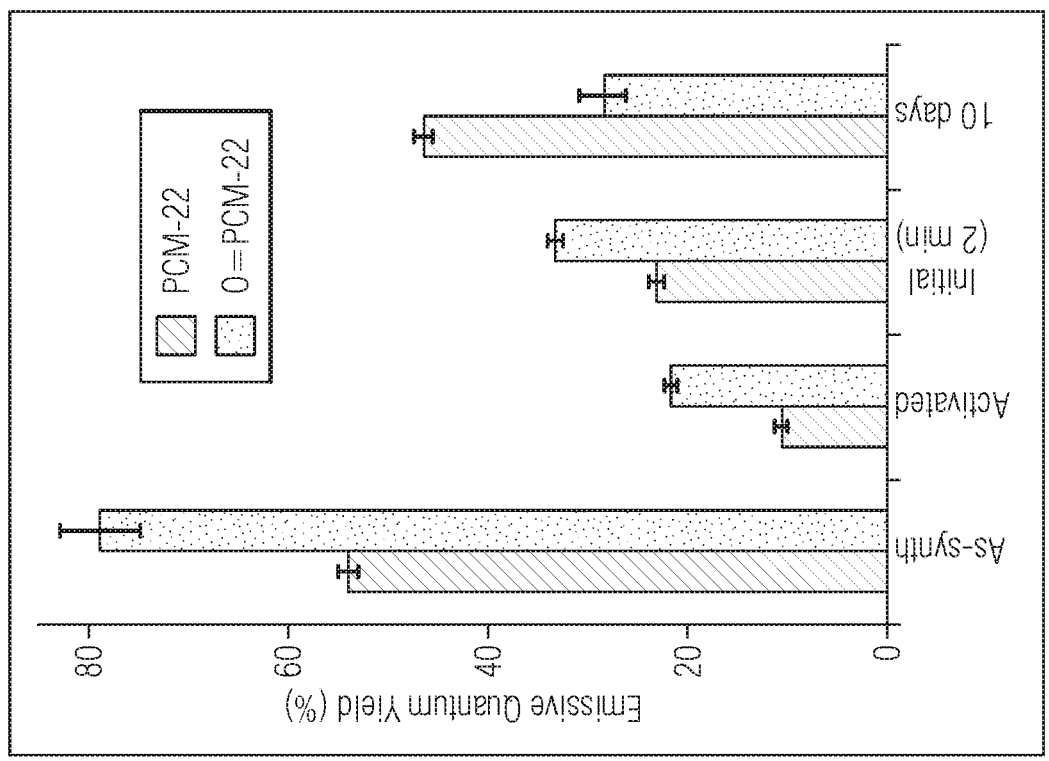
Figure 14A:
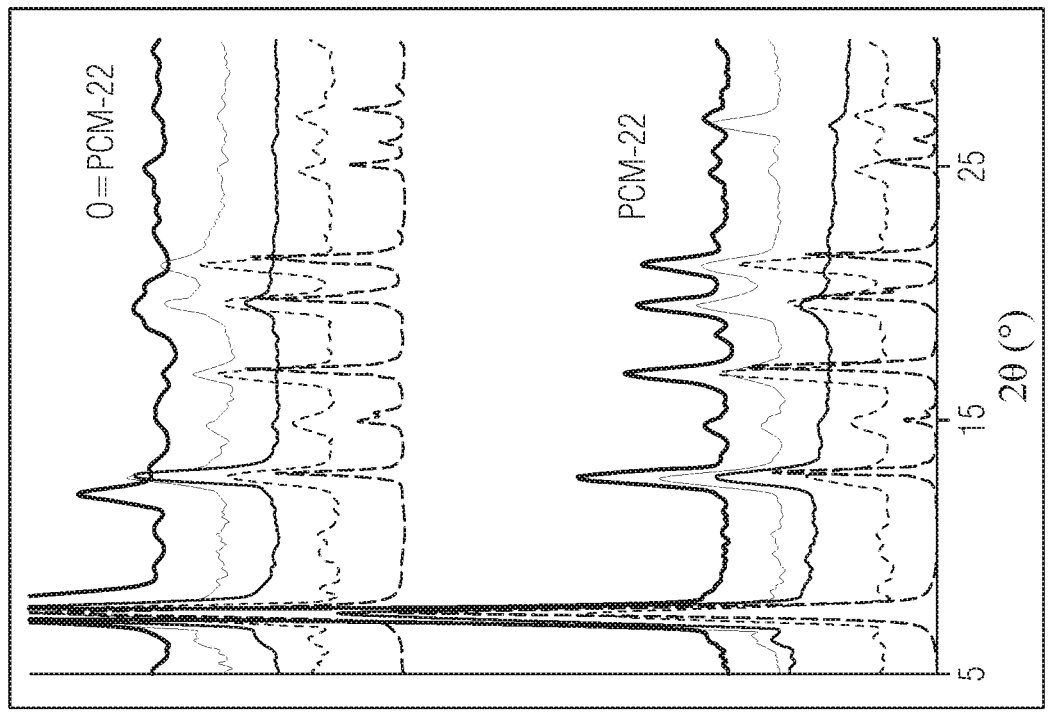

FIG. 14 shows various data relating to PCM-22 and O=PCM-22. FIG. 14A shows PXRD patterns for PCM-22 and O=PCM-22 as a function of solvation state (black=simulated data; red=as-synthesized; green=activated; yellow=re-solvated, 5 min; blue=resolvated, 10 days). FIG. 14B shows corresponding average $\phi_{PL}$ values for PCM-22 (green) and O=PCM-22 (red).

Figure 15:
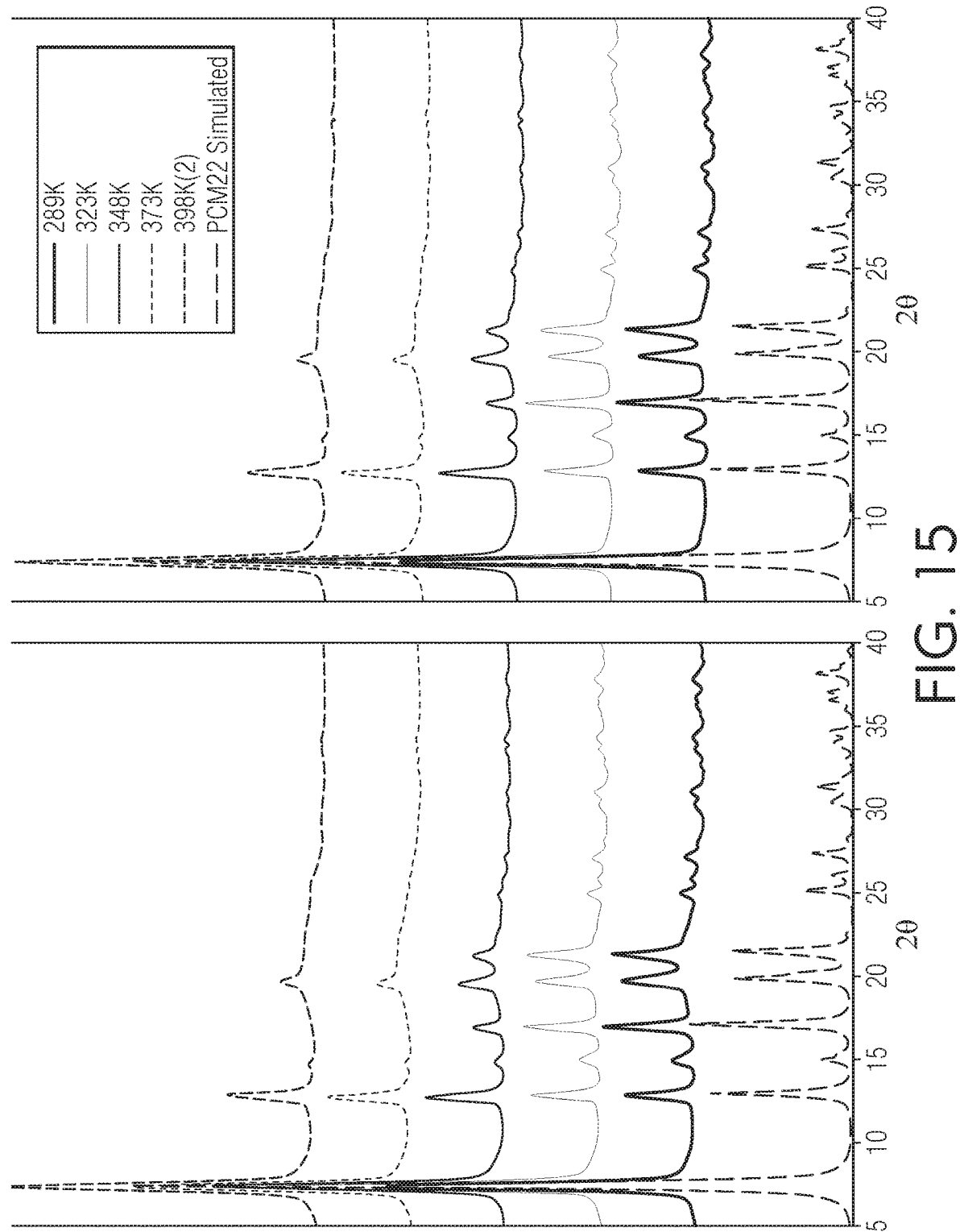

FIG. 15 shows temperature-dependent PXRD patterns for PCM-22 (left panel) and O=PCM-22 (right panel) as a function of activation temperature (bottom to top: simulated data (orange); 298 K (blue); 323 K (red); 348 K (green); 373 K (purple); when cooled back to 298 K (cyan)).

Figure 16:
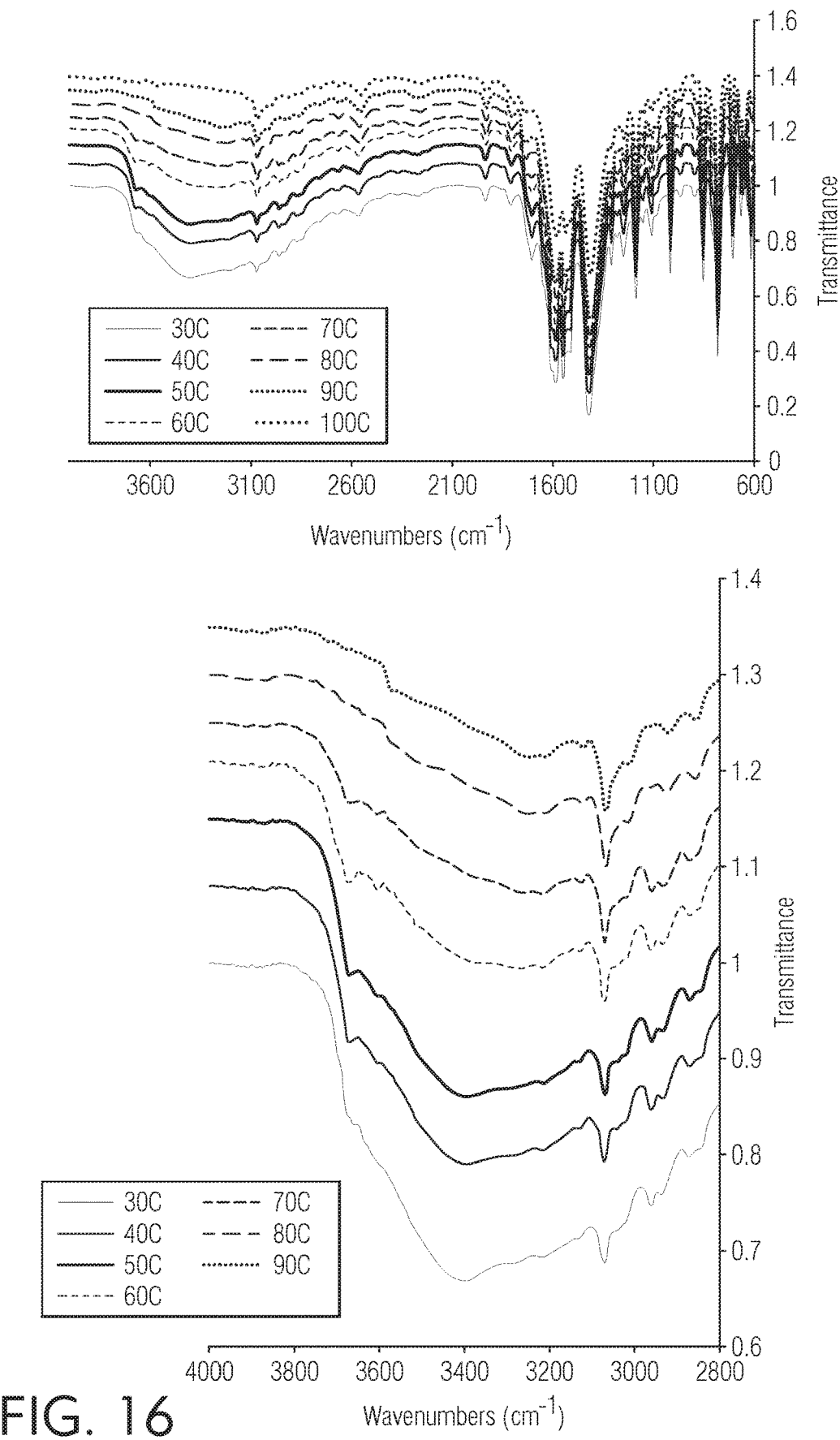
Figure 17A:
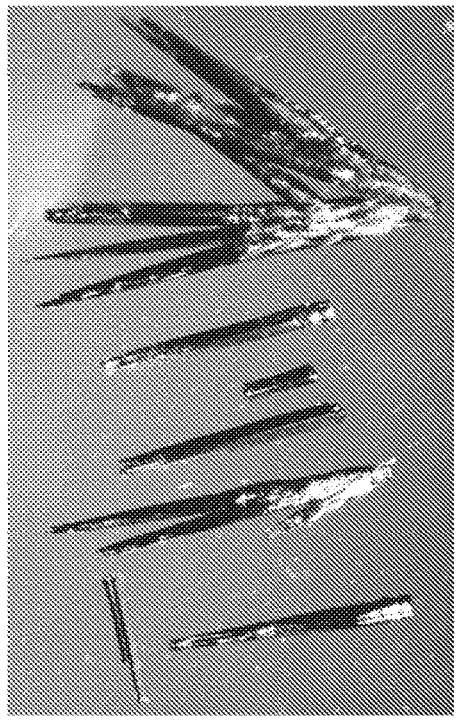
Figure 17B:
Figure 17C:
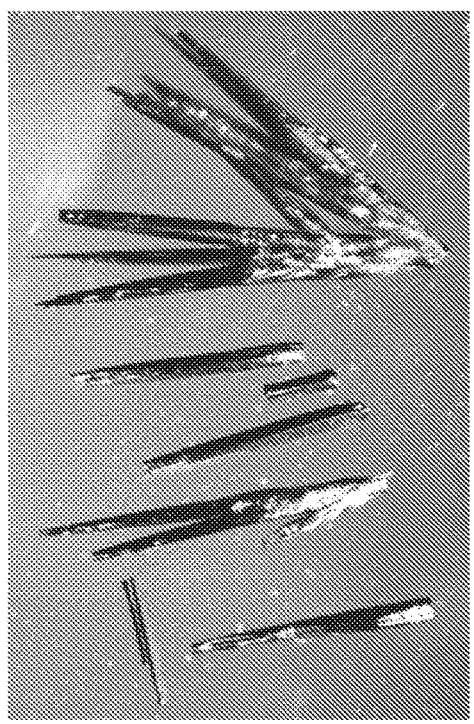
Figure 17D:

FIG. 16 shows temperature-dependent FT-IR data showing loss of $H_2O$ stretching bands in PCM-22 upon activation.

FIG. 17 shows light micrograph images of PCM-22 crystals taken over 10 days, showing no new nucleation or dissolution. The images were taken at the initial stage of nucleation (FIG. 17A); 1 day after nucleation (FIG. 17B); 5 days after nucleation (FIG. 17C); and 10 days after nucleation (FIG. 17D).

Figure 18:
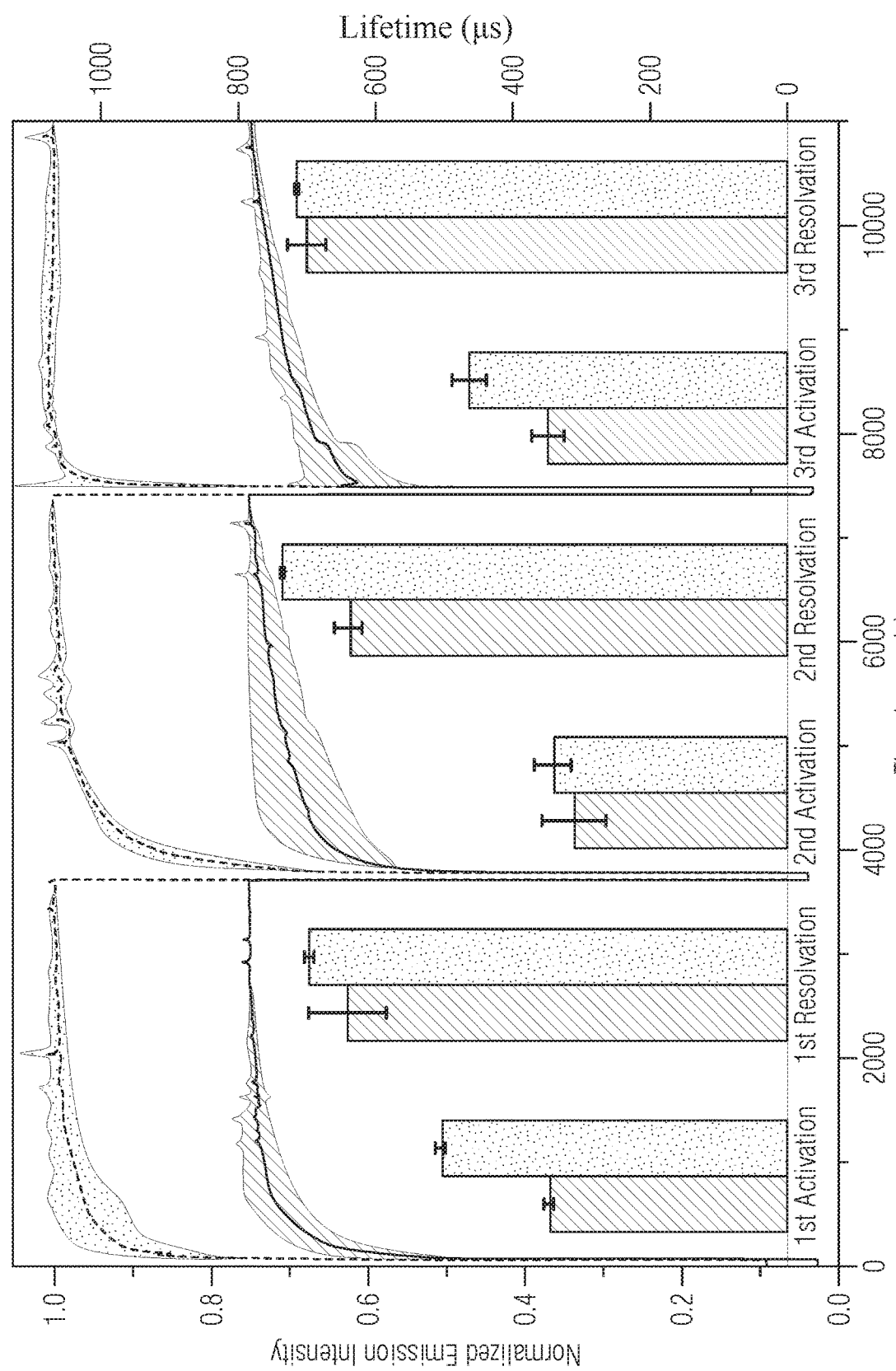

FIG. 18 shows response time study and reversibility of luminescence turn-on-turn-off for PCM-22 (green) and O=PCM-22 (red). The average emission intensities are shown as solid lines with shaded areas showing the error range obtained from three independent experiments. The inset shows excited state lifetimes.

Figure 19A:
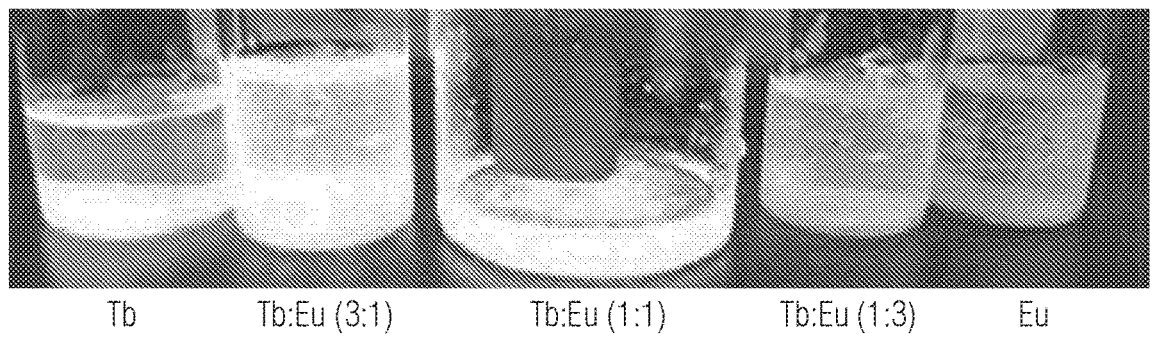
Figure 19B:
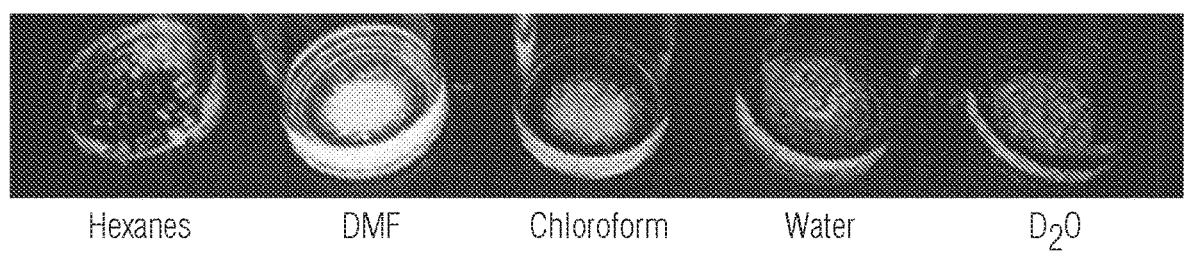
Figure 19C:
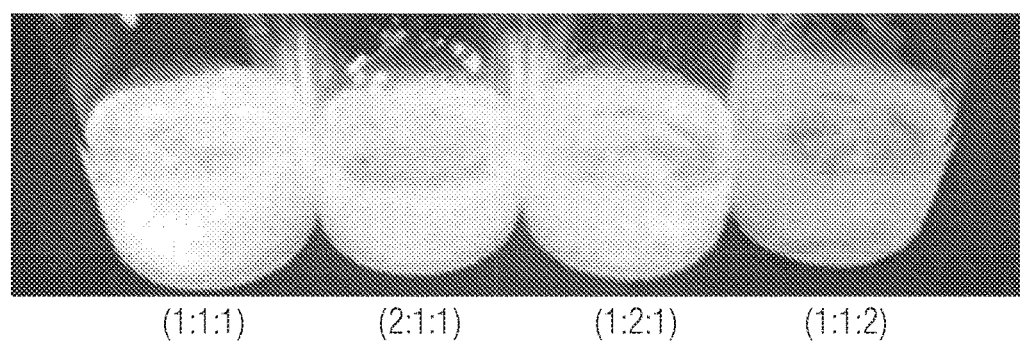

FIG. 19 provides images of various PCM-22 materials before and after exposure to solvents. FIG. 19A show images of light emission from PCM-22 materials that include Tb, Eu and mixed Tb:Eu. FIG. 19B shows the colors observed when the 1:1 Tb:Eu PCM-22 (originally yellow, as shown in FIG. 19A) is exposed to hexanes (red), dimethyl formamide (bright yellow), chloroform (orange), water (green), and heavy water (non-emissive). FIG. 19C shows a wider variety of colors observed for Tb:Eu:Tm trimetallic versions of PCM-22.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Current methods and sensors for detecting solvents in various environments have numerous limitations. Such limitations include detection speed, detection efficiency, detection accuracy, and reproducibility. For instance, current methods of detecting solvents within solvent feed stocks require sample isolation and chemical analysis. Such processes may take several days to complete. Such processes may also require the utilization of sophisticated instruments.

Figure 1:
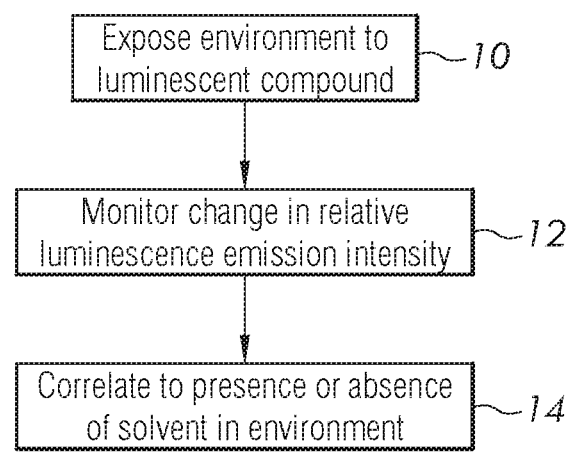

The present disclosure addresses the aforementioned limitations by utilizing various phosphorous-based photoluminescent compounds to detect solvents. In some embodiments, the present disclosure pertains to methods of monitoring an environment for the presence of a solvent by utilizing photoluminescent compounds. In some embodiments illustrated in FIG. 1, the methods of the present disclosure include exposing the environment to a luminescent compound (step 10), monitoring a change in the relative luminescence emission intensity of the luminescent compound (step 12), and correlating the observations to the presence or absence of a solvent in the environment (step 14). In particular, the absence of a change in the relative luminescence emission intensity of the luminescent compound can indicate the absence of the solvent from the environment. Likewise, the presence of a change in the relative luminescence emission intensity of the luminescent compound can indicate the presence of the solvent in the environment.

In some embodiments, the present disclosure pertains to sensors for monitoring an environment for the presence of a solvent. The sensors of the present disclosure generally include one or more phosphorous-based luminescent compounds.

As set forth in more detail herein, the methods and sensors of the present disclosure can have various embodiments. For instance, the methods and sensors of the present disclosure can utilize various types of luminescent compounds. In addition, various methods may be utilized to expose various environments to the luminescent compounds in order to detect various solvents. In addition, a change in the relative luminescence emission intensity of a luminescent compound can be monitored in various manners.

Luminescent Compounds

The methods and sensors of the present disclosure may utilize various luminescent compounds. In some embodiments, the luminescent compounds include a phosphorous atom with one or more carboxyl groups that are coordinated with one or more metallic ions, such as lanthanide ions, yttrium ions, and combinations thereof.

In some embodiments, the luminescent compounds of the present disclosure also include one or more light absorbing groups. In some embodiments, the light absorbing groups are coupled to the carboxyl groups. In some embodiments, the light absorbing groups include, without limitation, conjugated groups, aromatic groups, benzene groups, phenyl groups, aryl groups, alkene groups, alkyne groups, azides, cyano groups, and combinations thereof.

The luminescent compounds of the present disclosure can include various types of metallic ions. For instance, in some embodiments the luminescent compounds of the present disclosure include a single metallic ion. In some embodiments, the luminescent compounds of the present disclosure include a plurality of the same metallic ions. In some embodiments, the luminescent compounds of the present disclosure include a plurality of different metallic ions. In some embodiments, the luminescent compounds of the present disclosure include a plurality of metallic ions at different weight ratios (e.g., weight ratios of 1:1, 2:1, 1:3, 3:1, 1:1:1, 2:1:1, 1:2:1, 1:1:2, and the like).

In some embodiments, the luminescent compounds of the present disclosure include one or more metallic ions that include, without limitation, La, Ce, Pr, Nd, Pm, Sm, Eu, Gd, Tb, Dy, Ho, Er, Tm, Yb, Lu, Y, and combinations thereof. In some embodiments, the one or more metallic ions include lanthanide ions. In some embodiments, the lanthanide ions include, without limitation, Tb, Eu, Tm, and combinations thereof. In some embodiments, the luminescent compounds of the present disclosure include Tb, Eu, and Tm.

The phosphorous atoms of the luminescent compounds of the present disclosure may be in various forms. For instance, in some embodiments, the phosphorous atoms may be in non-oxidized form. In some embodiments, the phosphorous atoms may be oxidized. In some embodiments, the phosphorous atoms may be oxidized by post-synthetic oxidation methods.

The luminescent compounds of the present disclosure may have various structures. For instance, in some embodiments, the luminescent compounds of the present disclosure are porous. In some embodiments, the luminescent compounds of the present disclosure are in the form of a crystalline lattice. In some embodiments, the metallic ions in the luminescent compounds of the present disclosure coordinate with carboxyl groups on adjacent luminescent compounds to form the crystalline lattice.

In some embodiments, the luminescent compounds of the present disclosure have a honeycomb-like structure. In some embodiments, the luminescent compounds of the present disclosure are in the form of two-dimensional honeycomb sheets. In some embodiments, the luminescent compounds of the present disclosure are stacked in an eclipsed arrangement to provide a three-dimensional solid with large hexagonal channels.

The luminescent compounds of the present disclosure can have various surface areas. For instance, in some embodiments, the luminescent compounds of the present disclosure have surface areas that range from about 50 $m^2/g$ to about 1,000 $m^2/g$. In some embodiments, the luminescent compounds of the present disclosure have surface areas that range from about 250 $m^2/g$ to about 800 $m^2/g$. In some embodiments, the luminescent compounds of the present disclosure have surface areas that range from about 500 $m^2/g$ to about 750 $m^2/g$. In some embodiments, the luminescent compounds of the present disclosure have surface areas that range from about 500 $m^2/g$ to about 600 $m^2/g$.

The luminescent compounds of the present disclosure can have also various quantum yields. For instance, in some embodiments, the luminescent compounds of the present disclosure have absolute quantum yields of photoluminescence WO that range from about 20% to about 95%. In some embodiments, the luminescent compounds of the present disclosure have $\phi_{PL}$ values that range from about 35% to about 95%. In some embodiments, the luminescent compounds of the present disclosure have $\phi_{PL}$ values that range from about 50% to about 90%. In some embodiments, the luminescent compounds of the present disclosure have $\phi_{PL}$ values that range from about 80% to about 90%.

In some embodiments, the luminescent compounds of the present disclosure include one or more of compounds 1-9, as presented herein.

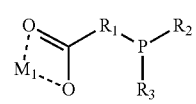

(1)

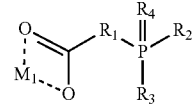

(2)

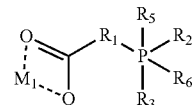

(3)

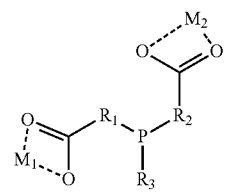

(4)

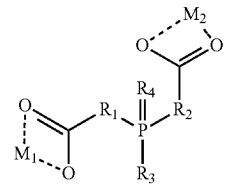

(5)

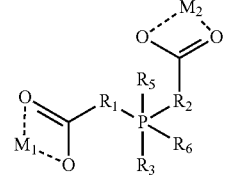

(6)

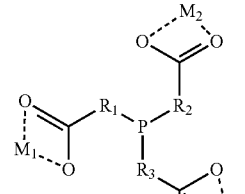

(7)

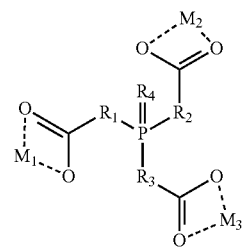

(8)

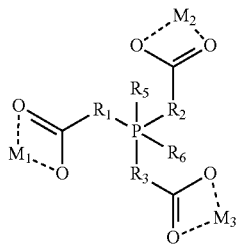

(9)

In some embodiments, each of $M_1$, $M_2$ and $M_3$ in compounds 1-9 represent metallic ions that include, without limitation, La, Ce, Pr, Nd, Pm, Sm, Eu, Gd, Tb, Dy, Ho, Er, Tm, Yb, Lu, Y, and combinations thereof. In some embodiments, each of $M_1$, $M_2$ and $M_3$ in compounds 1-9 represent lanthanide ions that include, without limitation, Tb, Eu, Tm, and combinations thereof.

In some embodiments, each of $R_1$, $R_2$, $R_3$, $R_5$, and $R_6$ in compounds 1-9 include, without limitation, light absorbing groups (as described previously), hydrogen (where feasible), oxygen, carbon-containing groups, aliphatic groups, non-aromatic groups, conjugated groups, aromatic groups, benzene groups, phenyl groups, aryl groups, heterocycles, cyclic groups, alkyl groups, alkane groups, alkene groups, alkyne groups, halides, azides, cyano groups, methyl groups, nitrogen groups, alkoxyl groups, carboxyl groups, carbonyl groups, ethers, esters, acetyl groups, acetoxy groups, acetomethoxy groups, acetoxymethyl esters, acetoxyalkyl esters, alkoxyalkyl esters, boron containing groups, silicon containing groups, phosphorous containing groups, sulfur containing groups, arsenic containing groups, germanium containing groups, selenium containing groups, aluminum containing groups, tin containing groups, antimony containing groups, tellurium containing groups, lead containing groups, bismuth containing groups, polonium containing groups, cycloamines, heteroatoms, and combinations thereof.

In some embodiments, each of $R_1$, $R_2$ and $R_3$ in compounds 1-9 include light absorbing groups. In some embodiments, the light absorbing groups include a phenyl group.

In some embodiments, $R_4$ in compounds 2, 5 and 8 include, without limitation, O, S, $NR_7$, $CR_8R_9$, and combinations thereof. In some embodiments, each of $R_7$, $R_8$ and $R_9$ includes, without limitation, light absorbing groups, hydrogen, oxygen, carbon-containing groups, aliphatic groups, non-aromatic groups, conjugated groups, aromatic groups, benzene groups, phenyl groups, aryl groups, heterocycles, cyclic groups, alkyl groups, alkane groups, alkene groups, alkyne groups, halides, azides, cyano groups, methyl groups, nitrogen groups, alkoxyl groups, carboxyl groups, carbonyl groups, ethers, esters, acetyl groups, acetoxy groups, acetomethoxy groups, acetoxymethyl esters, acetoxyalkyl esters, alkoxyalkyl esters, boron containing groups, silicon containing groups, phosphorous containing groups, sulfur containing groups, arsenic containing groups, germanium containing groups, selenium containing groups, aluminum containing groups, tin containing groups, antimony containing groups, tellurium containing groups, lead containing groups, bismuth containing groups, polonium containing groups, cycloamines, heteroatoms, and combinations thereof. In some embodiments, $R_4$ includes oxygen.

The $R_4$ group can be appended to the luminescent compounds of the present disclosure in various manners. For instance, in some embodiments, the $R_4$ group is appended to the luminescent compound through post-synthetic modification steps.

In some embodiments, the luminescent compounds of the present disclosure include compound 8. In some embodiments, each of $R_1$, $R_2$, and $R_3$ in compound 8 includes phenyl groups. In some embodiments, each of $M_1$, $M_2$, and $M_3$ in compound 8 includes Tb(III). In some embodiments, $R_4$ includes oxygen that has been appended through post-synthetic oxidation.

In some embodiments, the luminescent compounds of the present disclosure include compound 9. In some embodiments, each of $R_1$, $R_2$, and $R_3$ in compound 9 includes phenyl groups. In some embodiments, each of $M_1$, $M_2$, and $M_3$ in compound 9 includes Tb(III). In some embodiments, each of $R_5$ and $R_6$ in compound 9 includes, without limitation, carbon-containing groups (e.g., aliphatic or aromatic carbons), hydrogen, and combinations thereof.

Exposure of Luminescent Compounds to Environments

The luminescent compounds of the present disclosure may be exposed to various environments. For instance, in some embodiments, the environment includes, without limitation, a liquid environment, a solid environment, a gaseous environment, and combinations thereof.

In some embodiments, the environment is a liquid environment. In some embodiments, the liquid environment includes, without limitation, reservoirs, water formations, solutions, solvent feed stocks, and combinations thereof.

In some embodiments, the environment includes air. In some embodiments, the environment includes a landfill. In some embodiments, the environment is in its native form. In some embodiments, the environment is a sample (e.g., an aliquot) of its native form.

The luminescent compounds of the present disclosure may be exposed to an environment in various manners. For instance, in some embodiments, the exposing occurs by a method that includes, without limitation, mixing, incubating, swapping, dipping, and combinations thereof. In some embodiments, the exposing occurs by mixing the luminescent compound with the environment. In some embodiments, the exposing occurs by associating the environment with a structure that is embedded with a luminescent compound (e.g., a test strip).

In some embodiments, the luminescent compound is purified before exposure to an environment. For instance, in some embodiments, the luminescent compound is heated prior to exposure to an environment. In some embodiments, the luminescent compound is dried in a vacuum prior to exposure to an environment. In some embodiments, such purification steps reduce or eliminate the amount of solvents or impurities associated with a luminescent compound.

Solvents to be Detected

The methods of the present disclosure may be utilized to detect various solvents from an environment. In some embodiments, the environment includes a single solvent. In some embodiments, the environment includes a plurality of different solvents. In some embodiments, the solvent is in the form of at least one of liquids, gases, solids, and combinations thereof. In some embodiments, the solvent includes, without limitation, organic solvents, inorganic solvents, aqueous solvents, and combinations thereof. In some embodiments, the solvent to be detected includes, without limitation, water, alcohols, dioxane, toluene, dimethyl formamide, hexanes, chloroform, acetonitrile, pyridine, deuterium oxide, and combinations thereof.

Monitoring of Change in Relative Luminescence Emission Intensity

As set forth previously, the relative luminescence emission intensity of a luminescent compound of the present disclosure changes upon interaction with a solvent. As such, the absence of a change in the relative luminescence emission intensity of the luminescent compound can indicate the absence of the solvent from the environment. Likewise, the presence of the change in the relative luminescence emission intensity of the luminescent compound can indicate the presence of the solvent in the environment.

In some embodiments, the relative luminescence emission intensity of the luminescent compound increases in relation to its original luminescence emission intensity upon exposure to a solvent. In some embodiments, the relative luminescence emission intensity of the luminescent compound decreases in relation to its original luminescence emission intensity upon exposure to a solvent.

Without being bound by theory, the change in the relative luminescence emission intensity of a luminescent compound of the present disclosure can occur by various mechanisms. For instance, in some embodiments, the change in the relative luminescence emission intensity of the luminescent compound occurs when the solvent reversibly penetrates the luminescent compound. In some embodiments, the change in the relative emission intensity of the luminescent compound is caused by relative changes in intensity of emission from one or more metallic ions associated with the luminescent compound. For instance, in some embodiments where the luminescent compound includes two or more metallic ions (e.g., two or more lanthanides), the change in the relative luminescence emission intensity of the luminescent compound can be caused by relative changes in intensity of emission from each metallic ion.

In some embodiments, the change in the relative luminescence emission intensity of the luminescent compound is reversible. For instance, in some embodiments, the change in the relative luminescence emission intensity of the luminescent compound is reduced or eliminated as the solvent dissociates from the luminescent compound.

The change in the relative luminescence emission intensity of the luminescent compound can be observed in various manners. For instance, in some embodiments, the change in the relative luminescence emission intensity of the luminescent compound is represented by a change in color (e.g., a change in color from yellow to green upon interaction with a solvent). In some embodiments, the change in the relative luminescence emission intensity of the luminescent compound is represented by a change in visible light emission intensity. In some embodiments, the change in the relative luminescence emission intensity of the luminescent compound is represented by a change in a visible light emission pattern.

The change in the relative luminescence emission intensity of the luminescent compound can be monitored in various manners. For instance, in some embodiments, the monitoring occurs visually (e.g., visual observation of a color change). In some embodiments, the monitoring occurs in real-time. In some embodiments, the monitoring occurs by utilization of a device, such as a spectrometer.

In some embodiments, a single luminescent compound can be utilized to monitor the presence of a plurality of different solvents in the environment. For instance, in some embodiments, each of the plurality of different solvents causes a distinguishable change in the relative luminescence emission intensity of the luminescent compound. In more specific embodiments, each of the plurality of different solvents causes a distinguishable change in the color of the luminescent compound In some embodiments, a plurality of different luminescent compounds are utilized to monitor the presence of one or more solvents in the environment. For instance, in some embodiments, a solvent causes distinguishable changes in the relative luminescence emission intensities of different luminescent compounds.

Sensors

Additional embodiments of the present disclosure pertain to sensors for monitoring an environment for the presence of a solvent. The sensors of the present disclosure generally include one or more luminescent compounds of the present disclosure. Suitable luminescent compounds were described previously.

In some embodiments, the sensors of the present disclosure include a single luminescent compound. In some embodiments, the single luminescent compound is capable of monitoring the presence of a plurality of different solvents in the environment.

In some embodiments, the sensors of the present disclosure include a plurality of different luminescent compounds. In some embodiments, the plurality of different luminescent compounds are capable of monitoring the presence of one or more solvents in the environment.

The sensors of the present disclosure may be in various forms. For instance, in some embodiments, the sensors of the present disclosure may be in the form of a solid structure (e.g., a test strip), where one or more luminescent compounds are embedded with the solid structure. In some embodiments, the sensors of the present disclosure are in the form of a liquid or a solution that contains one or more luminescent compounds.

Additional Embodiments

Reference will now be made to more specific embodiments of the present disclosure and experimental results that provide support for such embodiments. However, Applicants note that the disclosure herein is for illustrative purposes only and is not intended to limit the scope of the claimed subject matter in any way.

EXAMPLE 1

On-Off Luminescence Switching in a Terbium-Phosphine Coordination Material and Luminescence Enhancement by Post-Synthetic Oxidation By way of background, the photoluminescent properties of lanthanide-based materials play an important role in modern light-emitting devices, optoelectronics, and chemical sensors. The ordered, periodic nature and thermal stability of metal-organic frameworks (MOFs) makes them ideal candidates for the preparation of luminescent Ln-based materials.

MOFs also offer unique chemical tunability. For instance, the so-called post-synthetic modification (PSM) chemistry is of current interest as a means to broadly functionalize MOFs toward targeted applications. PSM has already been exploited as a means to install a range of reactive chemical moieties into the pores of MOFs, thus inducing highly specific host-guest sorption and reactivity.

It is envisioned that PSM of Ln-based MOFs should provide convenient ways to directly affect, and potentially optimize, important solid-state luminescence properties (e.g., emissive quantum yields and lifetimes). Thus far, only a limited number of studies have validated this hypothesis, via the following PSM routes: (i) removal or exchange of coordinated solvent molecules; (ii) exchange of metal nodes with secondary lanthanide ions; and (iii) counter-ion exchange. Unfortunately, these types of PSMs are highly structure-dependent and are therefore not generally applicable. It is also difficult to logically predict a priori whether these PSMs will result in the targeted enhancement of the solid-state luminescence properties.

Meanwhile, luminescence tuning via the direct chemical PSM of organic groups in a pre-formed MOF has not been successfully demonstrated prior to this Example. This approach is of interest because chemical modification of organic chromophores is known to significantly alter the energy of their triplet excited states, in a predictable manner. This in turn affects the efficacy of the ligand-to-metal energy transfer process (also known as the antenna effect) and thus the metal-based luminescence.

Applicants have recently addressed ways to construct MOF-type materials using substituted triaryl phosphines. The Phosphine Coordination Materials (PCMs) are a unique subset of MOFs, characterized by having pores that are decorated with abundant Lewis basic $R_3P$: sites.

In this Example, Applicants demonstrate the on-off luminescence switching in a terbium-phosphine coordination material 22 (PCM-22) and luminescence enhancement by post-synthetic oxidation of PCM-22. PCM-22 is a Tb(III)/triphenylphosphine-based network coordination material. The material has a highly porous honeycomb-like structure with infinite hexagonal 1-D channels. It displays rapid and reversibly switchable on-off luminescence in the solid-state, in response to the presence of solvent. Post-synthetic oxidation of the free phosphine sites in PCM-22 proceeds quantitatively and in a single-crystal-to-single-crystal transformation, resulting in significant enhancement of the luminescence quantum yield via optimization of ligand-to-metal energy transfer.

In this Example, Applicants also describe the synthesis of PCM-22, which was obtained by the direct reaction of $Tb(NO_3)_3$ hydrate with tris(p-carboxylato)triphenylphosphine ($P(C_6H_4-4-CO2H)_3$; $tctpH_3$). The deprotonated trianion $tctp^{3-}$ reacts in a 1:1 fashion with $Tb^{3+}$ cations to give a charge-neutral and highly symmetric polymer based on the simple formula unit $[Tb(tctp)(OH_2)_3]\cdot3(1,4\text{-dioxane})$.

PCM-22 displays puckered 2D honeycomb sheets that stack in an eclipsed arrangement to give a 3-D solid with large hexagonal channels (FIG. 2). The $Tb^{3+}$ center in PCM-22 has a coordination number of 9, comprised of three facial bis(chelating) carboxylates, and three fac-$OH_2$ ligands (FIG. 2A). Alternating 3-connected phosphine-P and $Tb^{3+}$ nodes give rise to infinite puckered sheets of fused hexagonal rings with chair conformations (FIGS. 2B-C). The resulting 3,3-connected lattice topology is the same as that exhibited by the pure metallic phases of the heavier group XV elements, As and Sb (FIG. 2D).

PCM-22 inhabits the rarely observed polar space group P3c1. Thus, opposite faces of each sheet are chemically distinct (being comprised of either Tb or P atoms). In addition, the individual sheets of PCM-22 are inherently chiral (adjacent sheets consist of the other enantiomer).

The eclipsed close stacking of sheets observed in PCM-22 (FIGS. 2C-D) is similar to that observed for many covalent organic frameworks (COFs), where inter-layer n-n interactions dominate the supramolecular organization. Such stacking of 2-D sheets to give ordered pseudo-3-D materials is propitious because it results in large pores. Eclipsed packing is, however, quite unusual amongst 2-D MOFs, which more commonly adopt staggered-layer conformations that results in small void spaces.

Figure 2A:
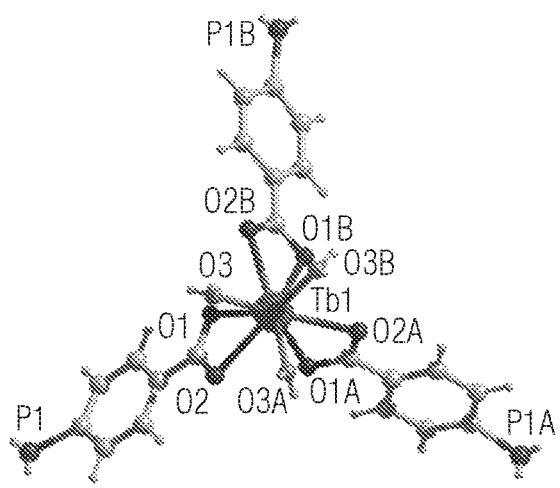
Figure 2B:
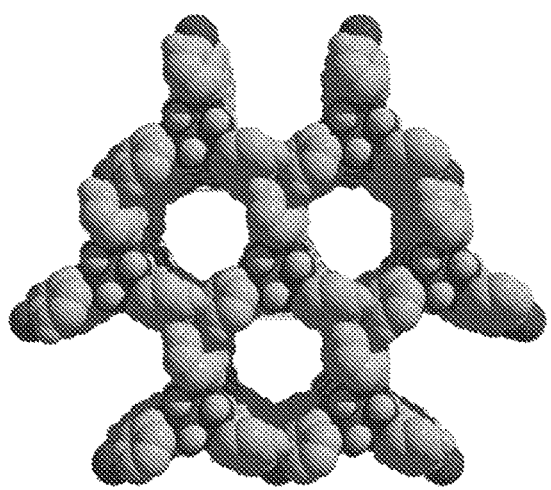
Figure 2D:
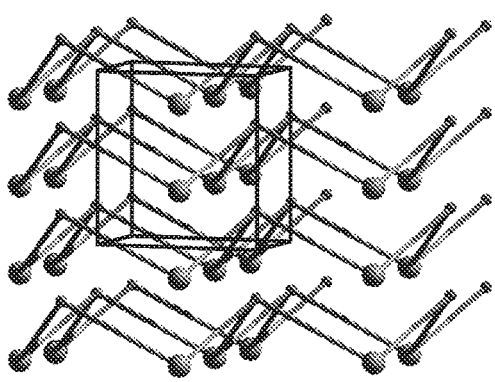
Figure 2C:
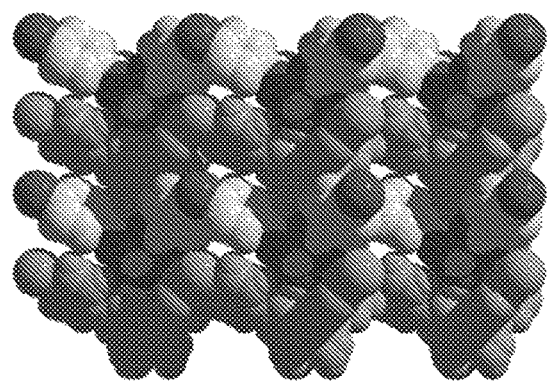
Figure 2E:
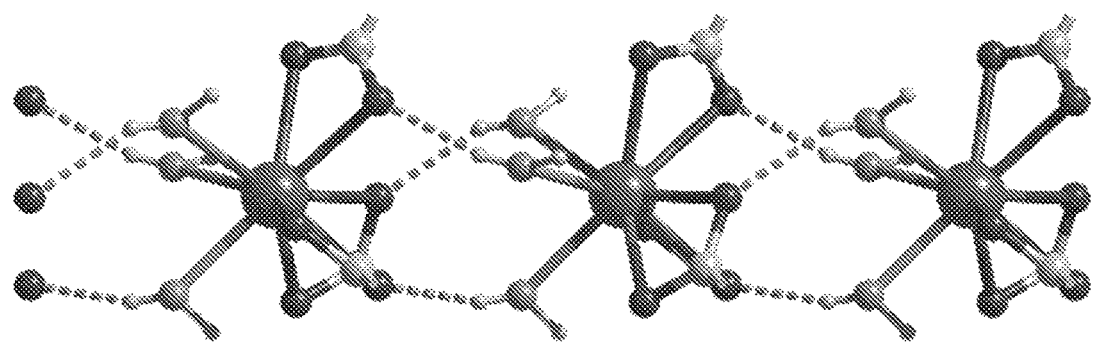

In fact, Applicants have observed the latter type of packing in three previously reported $Zn^{2+}$-based PCMs constructed using the same $tctp^{3-}$ ligand, which exhibit similar 3,3-c hexagonal nets. Interestingly, in this instance, eclipsing is imposed due to a network of close-range inter-layer hydrogen-bonding interactions between Tb-bound $OH_2$ ligands and carboxylate-O atoms (FIG. 2E).

The shortest O—O contact distances are 2.74 A. As a result, adjacent sheets are densely packed and the Tb-Tb inter-layer distance is only 5.77 A (FIG. 2C). The tctp ligands do not exhibit n-n interactions, since P-aryl groups in alternating layers are not aligned in parallel. The hexagonal channels in PCM-22 have a maximum van der Waals accessible opening of 14.5 A.

Figure 3:
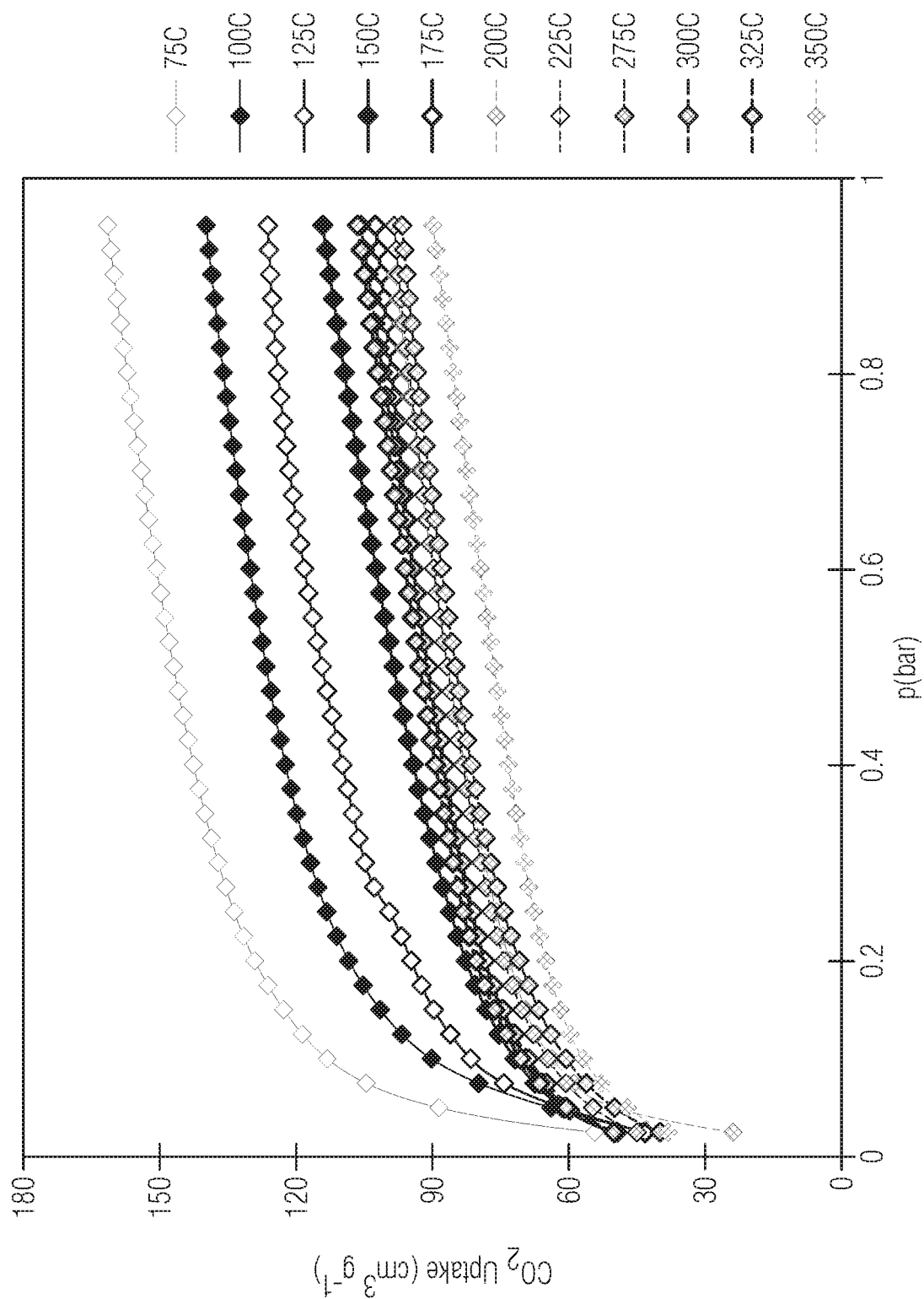
FIG. 3 shows the carbon dioxide ($CO_2$) adsorption of PCM-22 activated at various temperatures.
Figure 4:
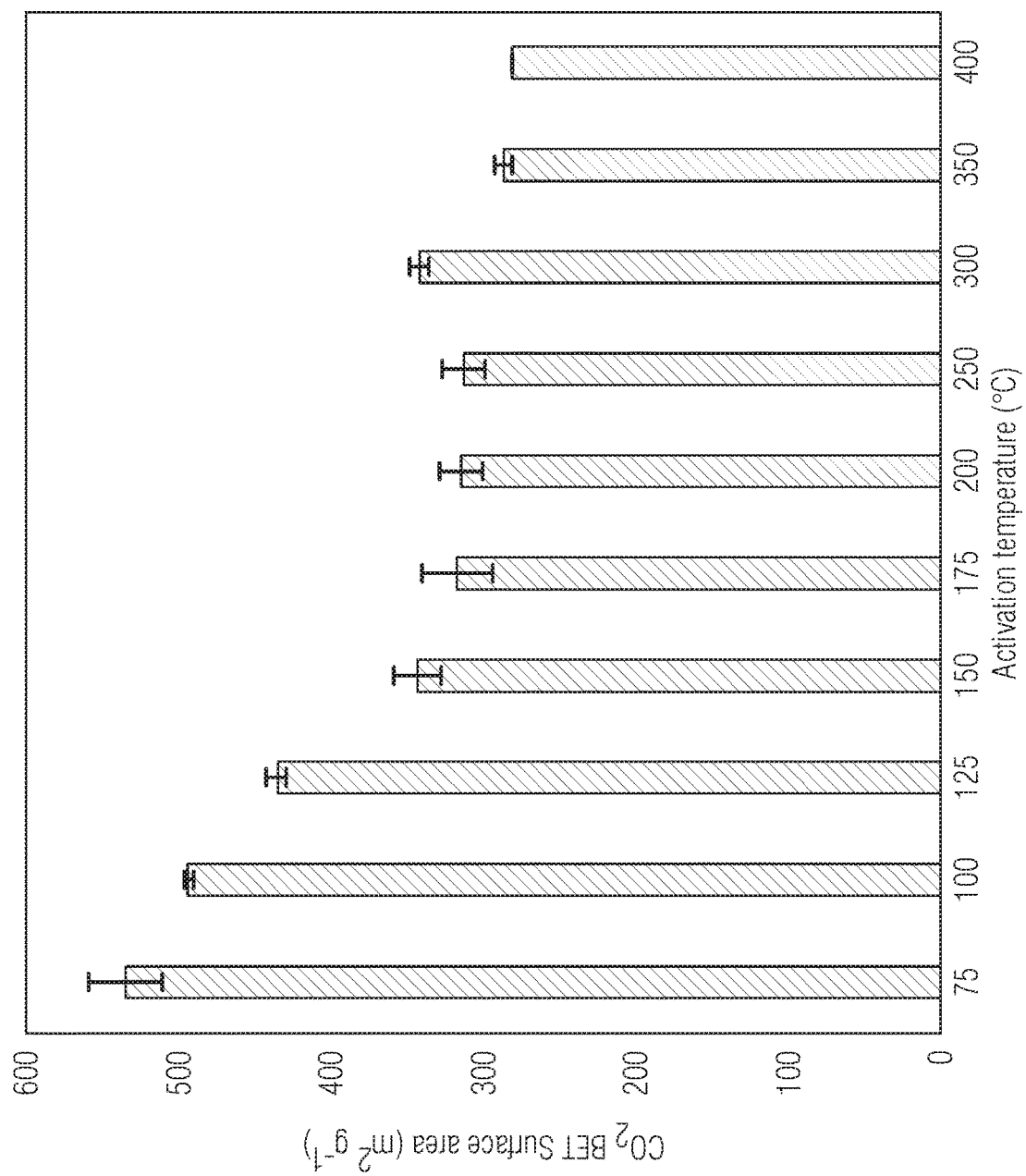
FIG. 4 shows the $CO_2$ BET surface area (p=1.0 atm) of PCM-22 when activated at various temperatures.

Well-ordered 1,4-dioxane solvent molecules present in the channels of the as-synthesized material were easily removed by evacuation at 75° C., resulting in a BET surface area of 559 $m^2$ $g^{-1}$ ($CO_2$, 196 K; FIG. 3). The activation conditions employed in this work were determined by monitoring the apparent change in BET surface area as a function of evacuation temperature (FIGS. 3-4).

Figure 5:
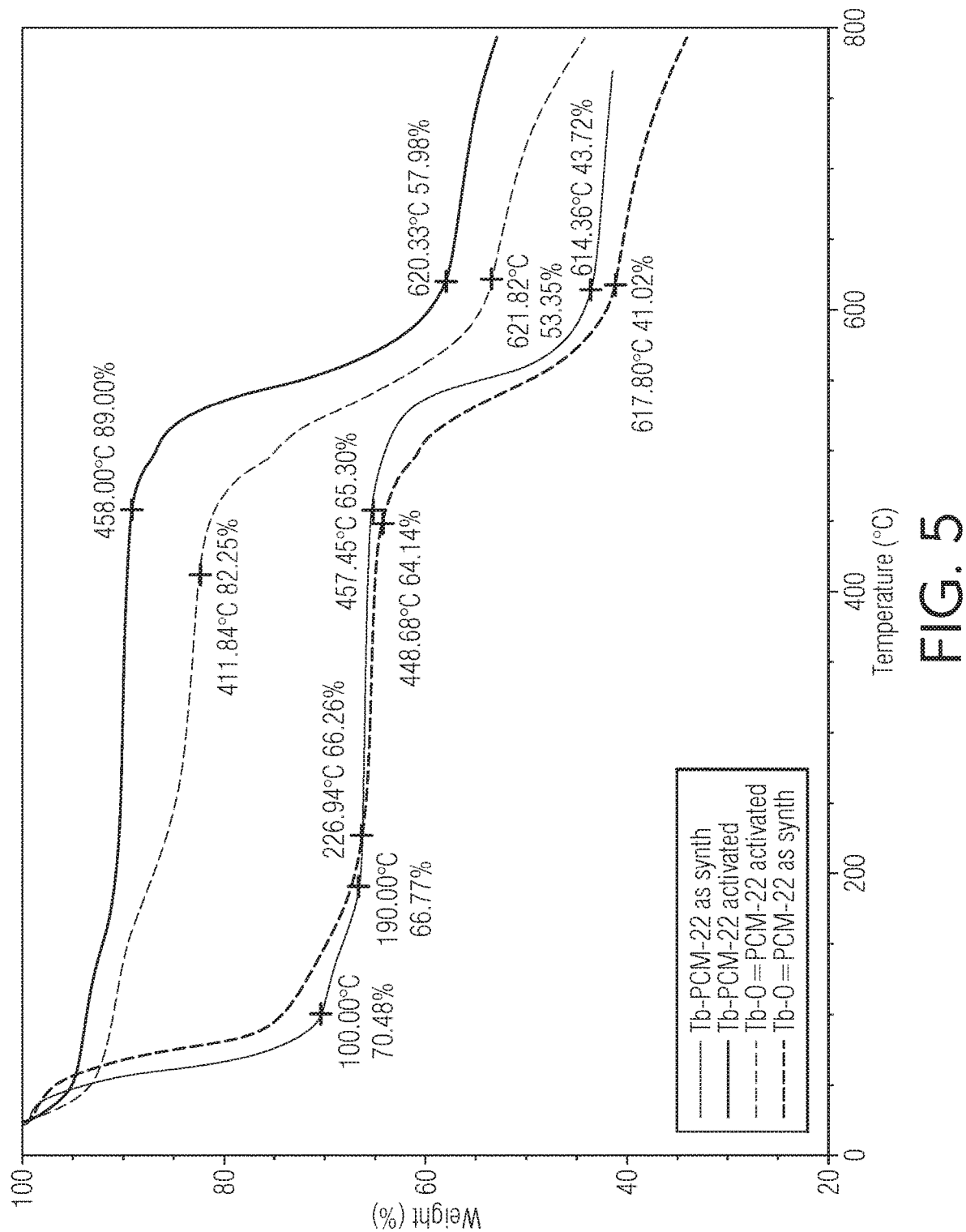
FIG. 5 shows the thermogravimetric analysis of as-synthesized and activated PCM-22. TGA was measured under $N_2$ carrier gas.

Crystalline samples were found to suffer a 39% reduction in surface area between 75 and 150° C. The measured surface area then remained constant for all activation temperatures up to 300° C. Thermogravimetric analysis (TGA) confirmed optimal thermal stability with the onset of framework decomposition occurring ca. 450° C. (FIG. 5).

An initial 29.5% mass loss below 100° C. corresponded to the loss of all unbound 1,4-dioxane present in the channels (expected 30.4%), which was followed by a further distinct 3.7% mass loss between 100-190° C., attributed to the loss of a single coordinated $H_2O$ molecule per Tb(III) (expected 3.1%). Above this temperature, no further mass loss occurred until 500° C.

Figure 6:
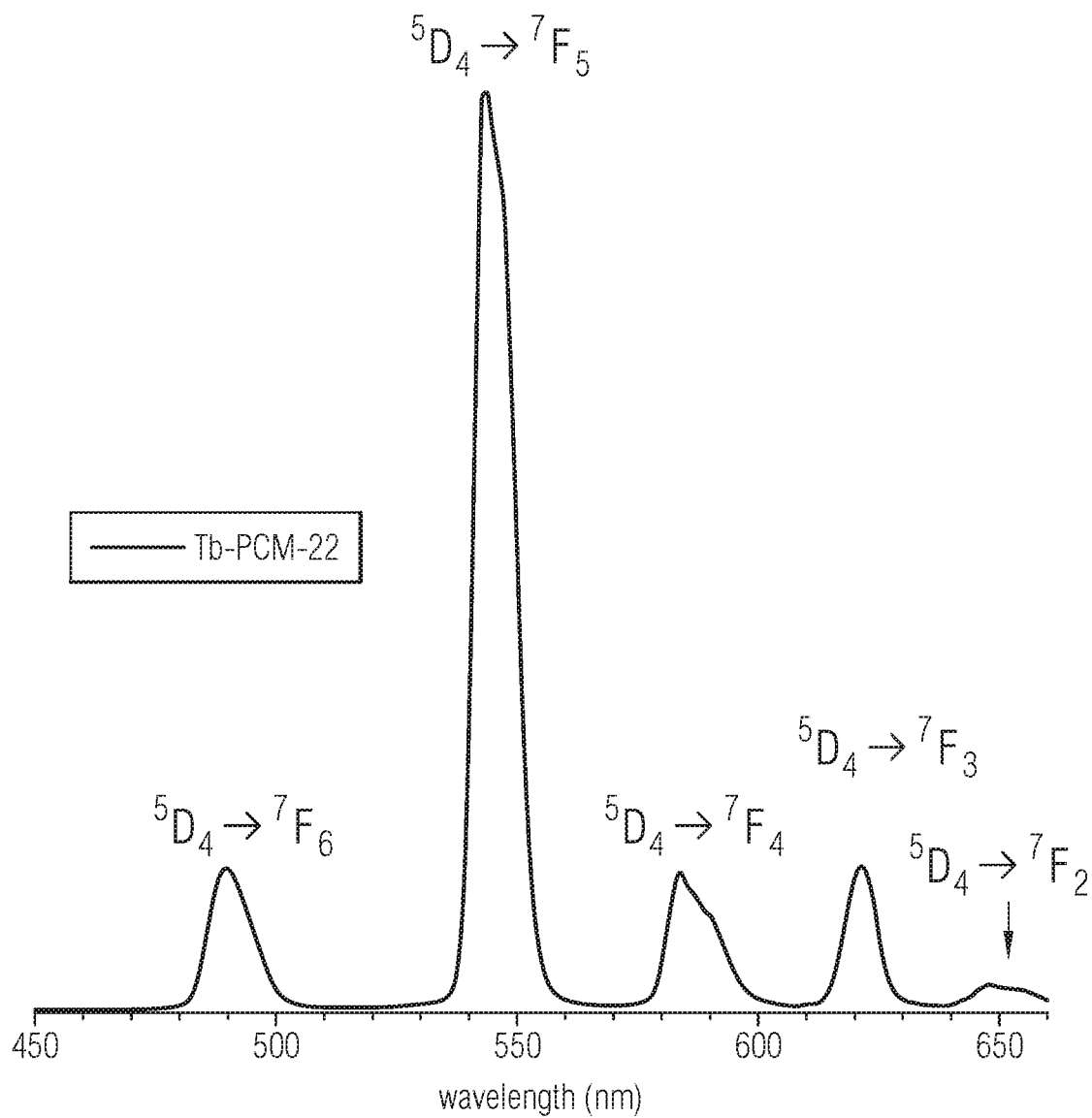
FIG. 6 shows the emission spectrum ($^5D4$ to $^7FJ$) of Tb-PCM-22.

The solid-state luminescence properties of an as-synthesized sample of PCM-22 were measured at room temperature without pretreatment, resulting in a spectrum characteristic of Tb(III) emission with well-resolved electronic transitions at 491, 544, 584 624 and 648 nm due to radiative relaxation from the $^5D_4$ excited state to the $^7FJ$ ground state (J=6, 5, 4, 3 and 2, respectively; FIG. 6). The average absolute quantum yield of photoluminescence ($\phi_{PL}$) by PCM-22 was 57±3%. Previous Tb(III)-based MOFs have reported $\phi_{PL}$ in the range of 22-90%.

Figure 7:
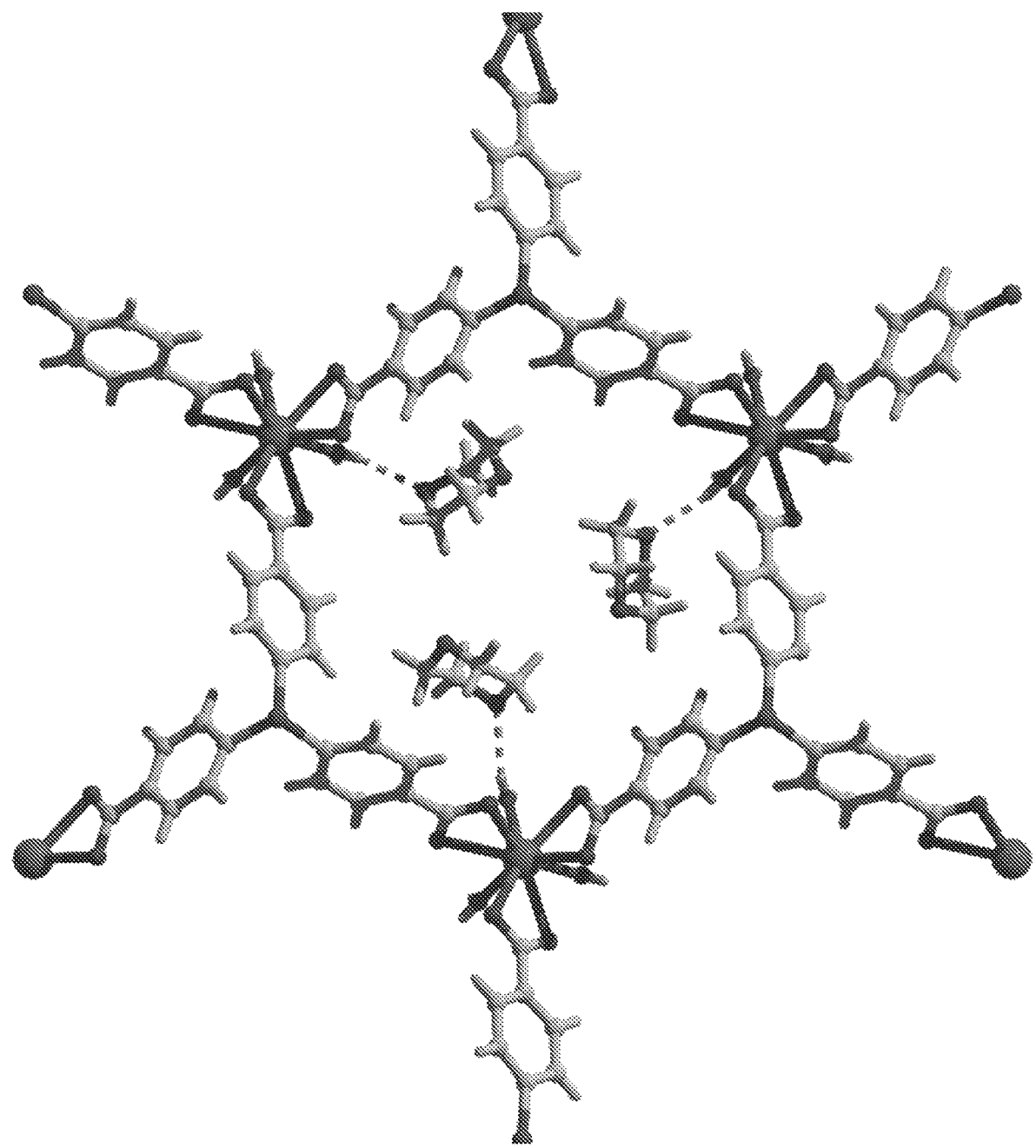
FIG. 7 shows the orientation of 1,4-dioxane molecules within the pores of as-synthesized PCM-22. The green dashed bonds show the shortest dioxane-O·HOH contacts (2.05 Å).

In PCM-22, there is an extensive H-bonding network. Each metal is coordinated by three $H_2O$ molecules and the structure also contains a solvent (1,4-dioxane & $H_2O$) in the channels, all of which are known emission quenchers (FIGS. 2E and 7). The relatively high $\phi_{PL}$ of PCM-22 was therefore surprising.

The number of $H_2O$ molecules present within the quenching sphere of the emissive Ln(III) ion (q) can be approximated by comparison of the emissive lifetime with that of an isostructural material prepared with $D_2O$ ligands. For PCM-22, this yielded an estimated 3.4±0.5 $H_2O$ molecules per Tb(III) ion, in close agreement with other characterizing data. The quenching ability of coordinated ligands, such as $H_2O$, is known to decrease when hydrogen-bonding interactions perturb the normal vibrational frequency of the oscillators that are responsible for coupling to a lanthanide excited state, resulting in non-radiative decay (e.g., O—H bonds in the case of $H_2O$).

Without being bound by theory, the accepted indirect excitation mechanism responsible for Tb-centered emission in MOF materials is via ligand-to-metal energy transfer, in which the organic scaffold is initially photo-excited, which ultimately results in population of ligand-centered triplet (T) excited states via established intersystem crossing pathways. To optimize lanthanide-based luminescence, it is therefore important to maximize the ligand-to-metal energy transfer efficiency. This is achieved by choosing organic chromophores, whose T1 energy levels are ca. 2,000-4,000 cm$^{-1}$ above the excited state of the corresponding lanthanide ion (20,366 cm$^{-1}$ for Tb(III)). Examination of the phosphorescence spectrum of the free ligand, tctpH$_3$, dissolved in a frozen glass of 2-methyltetrahydrofuran at 77 K, gave T$_1$=24,390 cm$^{-1}$. The T$_1$ energy of the tctp$^{3-}$ ligand shifts slightly when embedded in the material. The isostructural Gd(III)-based version of PCM-22 yielded a T$_1$=25,253 cm$^{-1}$ at 77 K.

From earlier work, it was already known that the T$_1$ level of the phosphine oxide derivative of the ligand (P(=O)(C$_6$H$_4$-4-CO$_2$H)$_3$; tctpoH$_3$) was 10% higher in energy than the free phosphine, at 26,882 cm$^{-1}$. Applicants were interested to explore the possibility of further enhancement of the Tb(III) emission quantum yield in PCM-22 by using the oxidized ligand to prepare an isostructural material, O=PCM-22. Unfortunately, it is not possible to prepare this material directly using the pre-oxidized tctpoH$_3$ ligand because the P=O moiety forms direct P=O^Tb bonds, resulting in a completely different material that has been described previously. However, Applicants unexpectedly observed that crystalline PCM-22 samples could be easily post-synthetically oxidized by simple, direct treatment with H$_2$O$_2$.

The oxidation proceeded quantitatively as monitored by MAS-$^{31}$P{$^1$H}-NMR, FT-IR and TGA studies (FIGS. 5 and 8-9). Most notably, the PSM occurred in a single-crystal-to-single-crystal manner, which allowed for the collection of high-quality single crystal X-ray diffraction data (FIG. 10). The oxide P=O distance (1.39 A) lies within the expected range. The X-ray structure also confirmed retention of the original bulk lattice structure and H-bonding network, and that there was no exfoliation caused by the PSM. The inter-layer Tb-Tb distance in O=PCM-22 (5.81 A) is almost the same as that observed in the original PCM-22 structure (5.77 A).

The isostructural nature of the two materials and the retention of bulk crystallinity of the functionalized material were confirmed by PXRD (FIG. 11). The measured bulk surface area of O=PCM-22 (346 m$^2$ g$^{-1}$; CO$_2$, 196 K) was slightly diminished compared to PCM-22, but is indicative of retention of microporosity (FIG. 12). Applicants believe this is the first time such a PSM has been fully structurally characterized in a MOF-type material.

Compared to the unoxidized parent material, the average $\phi_{PL}$ of O=PCM-22 was substantially increased by 27% to 84±3%, under identical conditions (FIG. 13). This result clearly demonstrates that Applicants were able to significantly enhance ligand-to-metal energy transfer in the solid-state by optimization of the ligand T$_1$ energy, via a simple and convenient oxidative PSM. The increase in the observed $\phi_{PL}$ is consistent with the trend described by prior work that studied a family of TbLx complexes and found that ligands, 'L', with T1 states>25,000 cm$^{-1}$ resulted in higher quantum yields.

Further investigations into the photoluminescence behavior of PCM-22 and O=PCM-22 revealed that both materials display highly reversible on-off luminescence in response to the degree of solvation. In order to accurately assess the relationship between the presence of solvents and coordinated H$_2$O ligands versus relative luminescence intensity, samples were desolvated in situ using a custom-made quartz tube. Counterintuitively, when samples were activated under vacuum at 100° C. over 12 hours, the solid-state luminescence was dramatically diminished. Moreover, temperature-dependent PXRD analysis indicated loss of bulk crystallinity (FIGS. 14-15). In addition, temperature-dependent FT-IR spectroscopy showed a decrease in the intensity of stretching bands attributed to coordinated H$_2$O above 80° C. (ca. 3400 cm$^{-1}$; FIG. 16). Exposure of an activated sample to D$_2$O resulted in an emissive lifetime change corresponding to the loss of one H$_2$O ligand per Tb(III). All of these observations are in direct agreement with the TGA studies.

Luminescence quenching as a direct consequence of desolvation has been observed in other MOFs. Loss of site-symmetry of individual Tb coordination environments, as well as changes in inter-layer Tb-Tb distances, are likely to result in more non-radiative processes. Through-space metal-to-metal energy migration is only favorable between ions separated by <10 A. Since the intra-layer Tb-Tb separation distance in PCM-22 is 13.7 A, it is clear that inter-layer energy migration must dominate. Without being bound by theory, it is reasonable to assume that desolvation of PCM-22 and O=PCM-22 disrupts the originally well-ordered H-bonding network, resulting in more molecular motions within the materials and more non-radiative decay pathways.

When the activated materials were re-exposed to a range of solvents (H$_2$O, alcohols, N,N-dimethylformamide, acetonitrile) either as liquids or vapors, the luminescence intensity was rapidly recovered. PXRD studies showed that bulk crystallinity was also quickly restored (FIG. 14A). Both the emissive quantum yields and crystallinity were maintained after 10 days of standing in solvent (FIG. 14B). The materials appear to display 'soft crystalline' behavior in that solid-state structural reorganization is possible without loss of long-range order.

To rule out the alternative possibility that the observed emission recovery upon resolvation could be due to physical dissolution and recrystallization, a sample of desolvated PCM-22 was immersed in solvent and constantly monitored over a period of 15 days under an optical microscope equipped with CCD camera. The macroscopic shape and volume of the crystals remained unchanged during this time and there was no evidence of nucleation of new crystallites (FIG. 17).

Next, Applicants decided to test the temporal response limit and reversibility of the materials, as potential visual turn-on sensors for solvent vapor. Desolvated samples of PCM-22 and O=PCM-22 (vac., 12 h at 100° C.) were exposed to fresh solvent (1:1:1 DMF/dioxane/H$_2$O) with continual monitoring of the emission intensity. This revealed that the emission was turned-on in a matter of seconds for both PCM-22 and O=PCM-22 (FIG. 18). After 5 seconds, 65 and 85% of the original emission intensity had been recovered, while the intensities were 91% and 94% recovered after 5 minutes (for PCM-22 and O=PCM-22, respectively). The emission intensities reached stable maxima after approximately 60 minutes. The samples were easily recycled by reactivation in vacuo and subsequent exposure to fresh solvent, without any marked loss of emission intensity or response time (FIG. 18).

The measured emissive lifetimes (FIG. 18, insets) demonstrate the recovery of Tb(III) emission was independent of changing surface characteristics of the crystalline powders upon activation and resolvation. Lifetimes are commonly used to demonstrate efficiency of lanthanide emission. The first activation showed a large difference in fresh samples of PCM-22 and O=PCM-22, the latter being more efficient. Upon exposure to solvent, the lifetimes increased, which is indicative of a decrease in the number of radiative decay pathways.

In summary, Applicants have shown that a new Tb(III)-based Phosphine Coordination Material with 2-D hexagonal honeycomb like structure shows reversible luminescence intensity changes in direct response to the extent of solvation. The most emissive state corresponds to the most solvated state, in which long-range structural order is maximized. Targeted oxidation of R3P: sites in PCM-22 was also demonstrated as a simple and convenient means to post-synthetically enhance the solid-state OPL via tuning of the T state of the organic framework components.

EXAMPLE 1.1

Materials and Methods

Tris(p-carboxylated) triphenylphosphine, $P(C_6H_4\text{-}4\text{-}COOH)_3$ was synthesized according to a literature method (Humphrey et al., Dalton Trans., 2009, 2298). 1,4-dibromobenzene (99%; Acros), n-butyllithium (2.5 M in hexanes; Acros) and metal salts (Sigma-Aldrich) were used as received. All solvents (Fisher Scientific) were pre-dried and degassed using an Innovative Technologies Solvent Purification System. FT-IR data were collected using a Thermo Scientific Nicolet iS50 spectrometer equipped with an ATR apparatus. TGA analyses were performed on a TA Instruments Q50 analyzer using high purity $N_2$ carrier gas in the range of 25-800° C. Solid-state NMR data were collected on a Bruker Avance-400 spectrometer (400 MHz for $^1H$) equipped with a standard 4 mm MAS NMR probe head. Spinning rates varied between 6 and 12 kHz. $H_3PO_4$ was used as an external reference for chemical shift calculations. Powder X-ray diffraction (PXRD) experiments were performed in borosilicate capillaries in a Rigaku R-Axis Spider diffractometer using Cu-$K_\alpha$ radiation with data collected in the range 5-40° 2θ. Simulated PXRD was generated using single crystal reflection data via SimPowPatt facility in PLATON. All samples were activated under reduced pressure at variable temperatures prior to gas uptake experiments. Gas adsorption isotherms were recorded on a Quantachrome Autosorb-1 system. All gases (99.995+%) were purchased from Praxair. Photophysical measurements were recorded on a Photon Technology International QM 4 spectrophotometer equipped with a 6-inch diameter K Sphere-B integrating sphere.

EXAMPLE 1.2

Synthesis of PCM-22

The phosphine ligand $P(C_6H_4\text{-}4\text{-}COOH)_3$ (39 mg, 0.10 mmol) was dissolved in dmf/$H_2O$/dioxane (1:1:1, 4.0 cm³), which had been degassed by bubbling $N_2$ for at least 10 minutes. To this was added a second solution of $Tb(NO_3)_3$ hydrate (0.20 mmol; two equivalents) dissolved in 4.0 cm³ of the same solvent. The reaction was heated in a scintillation vial using a graphite thermal bath at 80° C. for 3-4 days. The resulting colorless rod-like crystals of PCM-22 were isolated by washing and decanting any impurities away using the degassed DMF/$H_2O$/dioxane solvent mixture.

The solid was then Buchner filtered and thoroughly washed with the same solvent mixture. The crystalline solid was allowed to air dry and then stored under an $N_2$ atmosphere. Yield=25%; Anal. Found: C, 45.2; H, 2.66; P, 5.19%. $C_{21}H_{12}TbO_6P$ requires: C, 45.5; H, 2.20; P, 5.63%. $V_{max}$ (solid): 374 s, 486 m, 531 w, 539 w, 577 w, 612 m, 618 w, 662 w, 677 w, 699 w, 727 s, 773 s, 861 s, 876 m, 969 w, 1015 m, 1045 w, 1080 w, 1116 s, 1133 w, 1180 w, 1213 w, 1254 m, 1287 w, 1327 w, 1397 br s, 1494 w, 1523 s, 1578 s, 1653 m, 2851 w, 2886 w, 2912 w, 2953 w, 3243 br m.

EXAMPLE 1.3

Synthesis of O=PCM-22

An aliquot of hydrogen peroxide (0.5 mmol, 30%) was added directly into the mother liquor of the freshly synthesized PCM-22. The reaction was left to stand in the synthesis vial, at room temperature without stirring. This process was repeated three more times with fresh reagent. The solution mixture (which turned cloudy white upon addition of the peroxide) was decanted away and the remaining crystals washed with fresh aliquots of DMF/$H_2O$/dioxane solvent. O=PCM-22 crystals remained identical to those of the parent material and were suitable for single crystal X-ray analysis. The crystals were isolated by Buchner filtration and washed with abundant DMF/$H_2O$/dioxane mixture. Yield=90%; Anal. Found: C, 44.2; H, 3.22; P, 5.12%. $C_{21}H_{12}TbO_7P$ requires: C, 44.55; H, 2.14; P, 5.47%. $V_{max}$ (solid): 419 w, 486 m, 531 w, 578 m, 612 m, 617 w, 660 w, 675 w, 698 w, 728 s, 772 s, 860 s, 889 m, 969 w, 1015 m, 1043 w, 1080 w, 1114 s, 1133 w, 1180 br m, 1253 m, 1287 w, 1288 w, 1390 br s, 1495 w, 1523 s, 1581 s, 1651 s, 2851 w, 2886 w, 2915 w, 2953 w, 3256 br m.

EXAMPLE 1.4

Analysis

The solid-state NMR $^{31}P\{^1H\}$ NMR (162 MHz) spectra of PCM-22 and O=PCM-22 were recorded by Hahn-echo spin-mapping experiments, varying the carrier frequency from +1000 to −1000 ppm. All spectra were collected using a standard 4 mm NMR probe, a 4 mm $ZrO_2$ rotor with spinning rates between 10 and 13 kHz and 3.5 qs (180°) and 7 qs (90°) pulses. The $^{31}P\{^1H\}$ NMR spectrum for static Tb-PCM-22 showed one broad, symmetrical peak centered at 0 ppm with line width of 92 kHz (FIG. 8A). The signal shape did not change with spinning rate (10-12 kHz). Such a wide signal and lack of paramagnetic (Fermi-contact) shifts can be attributed to direct electron-nucleus dipolar interactions and a short relaxation time. It is probable that this signal belongs to remote phosphorous atoms while the nuclei closely located to paramagnetic ions were not observable due to an extremely short relaxation time. The $^{31}P\{^1H\}$ NMR spectrum for static O=PCM-22 was obtained by spin-mapping at various carrier frequencies. The spectrum (FIG. 8B) showed two peaks at 0 and −1000 ppm, the shape of which correspond to an axially-symmetric chemical shift tensor. The isotropic chemical shift 5(iso) can be estimated as −330 ppm. However, the spinning sample showed an isotropic shift of +32.7 ppm. Therefore, the spectra showed two phosphorous peaks with values of +32.7 and −1000 ppm belonging to separate, but closely located $^{31}P$ nuclei.

EXAMPLE 1.5

Photophysical Measurement

For quantum yield measurements, an integrating sphere was used. Quantum yield was calculated by dividing the area under the emission peaks of the complex by the difference between the area under the excitation peak of the sample from that of a blank (BaSO$_4$).

(Aem(sample)/(Aex(blank)−Aex(sample)), where A=area under peak).

Neglecting other quenchers, it is possible to get a general value of the water molecules (q) attached to the inner sphere of the ion. The q value, or hydration state, was determined based on equation [1] and the lifetime measurements obtained for PCM22/H$_2$O and PCM22/D$_2$O by monitoring the emission peak value at 543 nm, using an excitation of 340 nm. A was found to be 2.1 ms$^{-1}$ for Tb$^{+3}$ and a given error of ±0.5 H$_2$O molecules. As synthesized, the value of q was about 3 H$_2$O (supported by X-ray diffraction). Upon activation and resolvation with D$_2$O, q was about 2 H$_2$O, implying that a single H$_2$O had been removed and then replaced by D$_2$O (supported by TGA).

$$q\text{-}A(k_{H_2O}\ ^kD_2o) \quad [1]$$

As Synthesized q=3.4±0.5 water molecules 2.1 ms$^1$ (0.583 ms 1.022 ms). Resolvation with D$_2$O eq: 2.4±0.5 water molecules−2.1 ms$'^1$ (0.692 ms-1.097 ms).

EXAMPLE 2

Observation of Color Changes in Phosphine Coordination Materials Upon Exposure to Solvents In this Example, PCM-22 was prepared using the pure Ln elements Eu and Tb. The former Eu version emits red light, and the latter Tb version emits green light. When Applicants prepared isostructural materials with varying amounts of both metals in the same material, the net effect was to mix the colors (engendering yellow light, as illustrated in FIG. 19A). Next, when the material was evacuated, the luminescence turned off (i.e., the crystals became non-luminescent). However, upon exposure to a range of different liquid solvents or vapors thereof, the luminescence switched back on instantaneously (FIG. 19B). The color of the material ranged from green to yellow or orange or deep red, depending on the type of solvent (FIG. 19B).

The same detection mechanism can be applied to study the amounts of an impurity solvent within another solvent. For instance, Applicants can detect the presence of water in another solvent, depending on how much green light was present in the emission. The visually striking effect is also observed for PCM-22 version using different combinations of Ln metals. For instance, when applicants mixed a third metal (such as Tm) into PCM-22, Applicants accessed blue-to-white color transitions (FIG. 19C).

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A sensor for monitoring an environment for the presence of a solvent, wherein the sensor comprises:

a luminescent compound selected from the group consisting of:

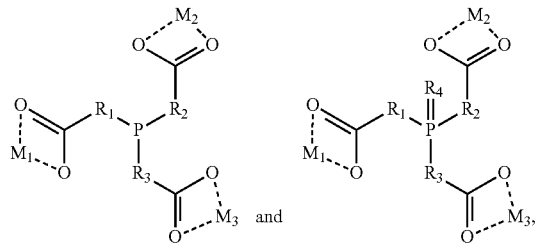

wherein the carboxyl groups are coordinated with a plurality of different metallic ions, wherein each of M$_1$, M$_2$ and M$_3$ comprises metallic ions selected from the group consisting of La, Ce, Pr, Nd, Pm, Sm, Eu, Gd, Tb, Dy, Ho, Er, Tm, Yb, Lu, Y, and combinations thereof;

wherein each of R$_1$, R$_2$, and R$_3$ is selected from the group consisting of conjugated groups, aromatic groups, benzene groups, phenyl groups, aryl groups, heterocycles, cyclic groups, and combinations thereof;

wherein R$_4$ is selected from O or S; and wherein the relative luminescence emission intensity of the luminescent compound changes upon interaction with the solvent.

2. The sensor of claim 1, wherein the sensor comprises a plurality of different luminescent compounds.

3. The sensor of claim 2, wherein the plurality of different luminescent compounds are capable of monitoring the presence of one or more solvents in the environment.

4. The sensor of claim 1, wherein the luminescent compound is porous.

5. The sensor of claim 1, wherein the luminescent compound is in the form of a crystalline lattice.

6. The sensor of claim 5, wherein the metallic ions in the luminescent compound coordinate with carboxyl groups on adjacent luminescent compounds to form the crystalline lattice.

7. The sensor of claim 1, wherein the one or more metallic ions comprise lanthanide ions selected from the group consisting of Tb, Eu, Tm, and combinations thereof.

8. The sensor of claim 1, wherein the phosphorous atom in the luminescent compound is oxidized.

9. The sensor of claim 1, wherein each of M$_1$, M$_2$ and M$_3$ comprises lanthanide ions selected from the group consisting of Tb, Eu, Tm, and combinations thereof.

10. The sensor of claim 1, wherein each of R$_1$, R$_2$ and R$_3$ comprises a phenyl group.

11. A sensor for monitoring an environment for the presence of a solvent, wherein the sensor comprises:

a luminescent compound selected from the group consisting of:

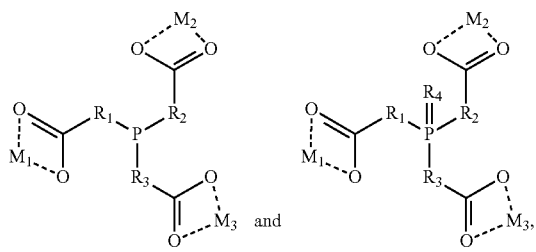

wherein the carboxyl groups are coordinated with metallic ions, wherein each of $M_1$, $M_2$ and $M_3$ comprises metallic ions selected from the group consisting of La, Ce, Pr, Nd, Pm, Sm, Eu, Gd, Tb, Dy, Ho, Er, Tm, Yb, Lu, Y, and combinations thereof;

wherein each of $R_1$, $R_2$, and $R_3$ is selected from the group consisting of conjugated groups, aromatic groups, benzene groups, phenyl groups, aryl groups, heterocycles, cyclic groups, and combinations thereof;

wherein $R_4$ is selected from O or S; and wherein the relative luminescence emission intensity of the luminescent compound changes upon interaction with the solvent.

12. The sensor of claim 11, wherein the sensor comprises a single luminescent compound.

13. The sensor of claim 12, wherein the single luminescent compound is capable of monitoring the presence of a plurality of different solvents in the environment.

14. The sensor of claim 11, wherein the luminescent compound comprises a plurality of the same metallic ions.

* * * * *